United States Patent
Feng et al.

(10) Patent No.: US 11,259,308 B2
(45) Date of Patent: Feb. 22, 2022

(54) SIGNAL PROCESSING METHOD AND APPARATUS

(71) Applicant: HUAWEI TECHNOLOGIES CO., LTD., Guangdong (CN)

(72) Inventors: Shulan Feng, Beijing (CN); Xiuyong Shen, Beijing (CN); Jinnan Liu, Beijing (CN); Xingwei Zhang, Lund (SE); Junren Chang, Beijing (CN)

(73) Assignee: Huawei Technologies Co., Ltd., Guangdong (CN)

( * ) Notice: Subject to any disclaimer, the term of this patent is extended or adjusted under 35 U.S.C. 154(b) by 20 days.

(21) Appl. No.: 16/817,789

(22) Filed: Mar. 13, 2020

(65) Prior Publication Data

US 2020/0213994 A1 Jul. 2, 2020

Related U.S. Application Data

(63) Continuation of application No. PCT/CN2018/105762, filed on Sep. 14, 2018.

(30) Foreign Application Priority Data

Sep. 14, 2017 (CN) .......................... 201710828912.1

(51) Int. Cl.
   *H04W 72/04* (2009.01)
   *H04L 5/00* (2006.01)

(52) U.S. Cl.
   CPC ......... *H04W 72/048* (2013.01); *H04L 5/0007* (2013.01); *H04L 5/0044* (2013.01);
   (Continued)

(58) Field of Classification Search
   CPC ....... H04L 5/00; H04L 5/0007; H04L 5/0044; H04L 5/0053; H04W 72/042;
   (Continued)

(56) References Cited

U.S. PATENT DOCUMENTS 8,325,661 B2 12/2012 Montojo et al.
9,451,607 B2 9/2016 Lee et al.
(Continued)

FOREIGN PATENT DOCUMENTS

CN 101286792 A 10/2008
CN 101527965 A 9/2009
(Continued)

OTHER PUBLICATIONS

Qualcomm, R1-1714185 "UE Processing Time," Aug. 12, 2017, 3GPP TSG-RAN WG1 #90 Aug. 21-25, 2017 Prague, Czech Republic (Year: 2012).*

(Continued)

*Primary Examiner* — Maharishi V Khirodhar
*Assistant Examiner* — Kenneth P Hunt
(74) *Attorney, Agent, or Firm* — Fish & Richardson P.C.

(57) ABSTRACT

This application provides a signal processing method and apparatus. A network device obtains capability information of a terminal device, where the capability information includes a processing time period for uplink data of the terminal device and a processing time period for uplink control information of the terminal device; determines a first time-frequency resource based on the capability information, where the first time-frequency resource is used to carry first uplink data and/or first uplink control information; and sends first signaling to the terminal device, where the first signaling indicates the first time-frequency resource. This application can improve efficiency of configuring a time-frequency resource by the network device for the first uplink data and/or the first uplink control information of the terminal device, thereby reducing a signal transmission delay.

15 Claims, 12 Drawing Sheets

(52) U.S. Cl.
CPC ......... *H04L 5/0053* (2013.01); *H04W 72/042* (2013.01); *H04W 72/044* (2013.01)

(58) Field of Classification Search
CPC ... H04W 72/048; H04W 72/044; H04W 8/24; H04W 72/1284; H04W 72/0413; H04W 72/1278
See application file for complete search history.

(56) References Cited

U.S. PATENT DOCUMENTS

| | | | |
|---|---|---|---|
| 2007/0026881 | A1 | 2/2007 | Tzavidas et al. |
| 2012/0257551 | A1 | 10/2012 | Diao et al. |
| 2013/0077541 | A1 | 3/2013 | Lin et al. |
| 2014/0177580 | A1* | 6/2014 | Takaoka ............... H04B 1/713 370/329 |
| 2018/0206221 | A1 | 7/2018 | Chen et al. |
| 2019/0007942 | A1* | 1/2019 | Takeda ............... H04W 72/0446 |
| 2019/0320431 | A1* | 10/2019 | Huang ............... H04W 72/14 |
| 2020/0022151 | A1* | 1/2020 | Zhou ............... H04W 8/24 |
| 2020/0205228 | A1* | 6/2020 | Takeda ............... H04W 8/24 |
| 2020/0305147 | A1* | 9/2020 | Lee ............... H04L 1/1861 |
| 2020/0344032 | A1* | 10/2020 | Yang ............... H04W 72/0453 |

FOREIGN PATENT DOCUMENTS

| | | |
|---|---|---|
| CN | 101807984 A | 8/2010 |
| CN | 102083211 A | 6/2011 |
| CN | 102118860 A | 7/2011 |
| CN | 102916792 A | 2/2013 |
| CN | 106454901 A | 2/2017 |
| CN | 106533629 A | 3/2017 |
| CN | 107113839 A | 8/2017 |
| EP | 3099118 A1 | 11/2016 |
| WO | 2016148789 A1 | 9/2016 |
| WO | 2017045487 A1 | 3/2017 |

OTHER PUBLICATIONS

Qualcomm R1-1713449 "Email Discussion UE Processing Time," Aug. 12, 2017, 3GPP TSG-RAN WG1 #90 Aug. 21-25, 2017 Prague, Czech Republic (Year: 2012).*
MediaTex R1-17013977 "UE Processing Time Evaluation," Aug. 12, 2017, 3GPP TSG-RAN WG1 #90 Aug. 21-25, 2017 Prague, Czech Republic (Year: 2012).*
Huawei et al., "HARQ timing, multiplexing, and bundling", 3GPP TSG RAN WG1 Meeting AH_NR#3, R1-1715408, XP051328971, Nagoya, Japan, Sep. 18-21, 2017, 7 pages.
Intel Corporation, "Processingtimes and HARQ pracesses in NR", 3GPP TSG RAN WG1 Meeting #90, R1-1712598, XP051315413, Prague, Czechia, Aug. 21-25, 2017, 5 pages.
Extended European Search Report issued in European Application No. 18855871.2 dated Jul. 2, 2020, 9 pages.
Office Action in Indian Application No. 202037011968, dated Mar. 19, 2021, 9 pages.
3GPP TS 36.211 V14.3.0 (Jun. 2017),3rd Generation Partnership Project,Technical Specification Group Radio Access Network,Evolved Universal Terrestrial Radio Access (E-UTRA),Physical channels and modulation(Release 14), 195 pages.
3GPP TS 38.213 V1.0.0 (Sep. 2017), 3rd Generation Partnership Project, Technical Specification Group Radio Access Network, NR, Physical layer procedures for control(Release 15), 16 pages.
3GPP TS 38.214 V1.0.0 (Sep. 2017), 3rd Generation Partnership Project, Technical Specification Group Radio Access Network, NR, Physical layer procedures for data (Release 15), 32 pages.
3GPP TS 38.331 V0.0.5 (Aug. 2017),3rd Generation Partnership Project, Technical Specification Group Radio Access Network, NR, Radio Resource Control (RRC), Protocol specification(Release 15 ), 38 pages.
PCT International Search Report and Written Opinion in International Application No. PCT/CN2018/105,762, dated Dec. 19, 2018, 15 pages (With English Translation).
Office Action issued in Chinese Application No. 201710828912.1 dated Mar. 4, 2020, 17 pages (with English Translation).

* cited by examiner

SIGNAL PROCESSING METHOD AND APPARATUS

CROSS-REFERENCE TO RELATED APPLICATIONS

This application is a continuation of International Application No. PCT/CN2018/105762, filed on Sep. 14, 2018, which claims priority to Chinese Patent Application No. 201710828912.1, filed on Sep. 14, 2017. The disclosures of the aforementioned applications are hereby incorporated by reference in their entireties.

TECHNICAL FIELD

This application relates to the communications field, and more specifically, to a signal processing method and apparatus.

BACKGROUND

A conventional wireless cellular communications system includes a network device and a terminal device. Transmission from the terminal device to the network device is referred to as uplink transmission, transmission from the network device to the terminal device is referred to as downlink transmission, and specific uplink signals sent by the terminal device on corresponding uplink time-frequency resources are usually specified by the network device. Specifically, the network device sends uplink scheduling signaling. The uplink scheduling signaling is used to notify the terminal device of specific time-frequency resources on which uplink data is sent. After receiving the uplink scheduling signaling, the terminal device generates an uplink data packet as instructed by the uplink scheduling signaling, and sends the uplink data on the scheduled time-frequency resources. In addition, the network device further sends some channel state information reference signals (Channel State Information-Reference Signal, CSI-RS) used for channel state measurement. The terminal device measures these reference signals to obtain channel state information, including a channel quality indicator (Channel Quality Indicator, CQI), a rank indicator (Rank Indication, RI), and channel precoding matrix information (Proceeding Matrix Indicator, PMI). The terminal device sends channel state measurement feedback information to the network device by using an uplink signal. In a previous conventional cellular communications system, a terminal receives uplink scheduling information in a $n^{th}$ subframe, and sends uplink data in the $(n+4)^{th}$ subframe or after the $(n+4)^{th}$ subframe. A time period for processing the uplink data is approximately four subframes, and duration of each subframe is 1 ms. For channel measurement, a CSI-RS is sent in the $n^{th}$ subframe, and channel measurement feedback information specific to the CSI-RS is sent in the $(n+4)^{th}$ subframe or after the $(n+4)^{th}$ subframe. If the uplink data and the channel measurement feedback information are sent in a same subframe, some resources scheduled for uplink data transmission are reserved to transmit the channel measurement feedback information. This is referred to as multiplexing transmission of the uplink data and the channel measurement feedback information. In view of this, the terminal needs to perform puncturing and rate matching on the uplink data. In this case, before processing the uplink data, the terminal needs to learn whether a resource in the scheduled uplink resources needs to be reserved for channel measurement feedback. In an existing cellular communications system, a terminal learns, approximately 4 ms in advance, whether uplink data and channel measurement feedback are multiplexed. In this case, before performing uplink rate matching, the terminal may learn whether a resource in scheduled uplink transmission needs to be reserved for the channel measurement feedback, and therefore, processing on the channel measurement feedback information does not cause an uplink data processing problem. Therefore, in the conventional cellular system, during scheduling, the network device does not specially consider impact of a channel measurement feedback time period on uplink transmission.

In a next-generation wireless communications system, for example, a new radio (New Radio, NR) system, a plurality of low-delay requirements are proposed to improve user experience. Implementation of a low delay is embodied mainly in two aspects, for example, a low delay in data transmission and a low delay in channel quality feedback. Using a 3GPP long term evolution (Long Term Evolution, LTE) or a new radio access network (New Radio Access Network, NR) system as an example, in uplink transmission, a terminal device is required to quickly send uplink data after receiving scheduling signaling from a network, to reduce a data transmission delay. In the NR system, an uplink processing time period is required to be low to several symbols, for example, N2 symbols. The network device sends a downlink reference signal CSI-RS to trigger the terminal device to periodically or aperiodically measure a channel status and report channel state measurement information to the network device as soon as possible, to shorten a channel quality feedback time period. In the NR system, a channel measurement feedback information processing time period may be several OFDM symbols to several slots based on different measurement requirements. It is assumed that the processing time period is K1 symbols. If the network device sends uplink scheduling signaling in a slot n, the scheduling signaling requires the terminal device to send the uplink data in the slot n. In addition, the network device further sends the CSI-RS in the slot n, and schedules the terminal device to multiplex and transmit the channel measurement feedback information specific to the CSI-RS and data in the slot n. In this case, the terminal device can start some uplink processing only after processing on the channel measurement feedback information is completed. For example, uplink rate matching parameter calculation and uplink data rate matching can be performed only after a size of the channel measurement feedback information is obtained. Consequently, an uplink processing time period is increased, an uplink transmission delay is increased, spectral efficiency is reduced, and an uplink transmission failure even occurs because the terminal device cannot complete uplink processing before uplink transmission required by the network device.

SUMMARY

This application provides a signal processing method and apparatus, to improve precision of configuring a time-frequency resource by a network device for uplink data and/or channel state measurement information of a terminal device, thereby reducing a data transmission delay.

According to a first aspect, a signal processing method is provided. The method includes: obtaining capability information of a terminal device, where the capability information includes a processing time period for uplink data of the terminal device and a processing time period for uplink control information of the terminal device; determining a first time-frequency resource based on the capability information, where the first time-frequency resource is used to carry first uplink data and/or first uplink control information; and sending first signaling to the terminal device, where the first signaling indicates the first time-frequency resource.

A network device determines, based on the capability information that includes the processing time period for the uplink data of the terminal device and the processing time period for the uplink control information of the terminal device, the first time-frequency resource used to carry the first uplink data and/or the first uplink control information, and sends the first signaling to the terminal device to indicate the first time-frequency resource. In this way, a relatively long transmission delay or a scheduling failure for the first uplink data and/or the first uplink control information is avoided, that is, efficiency of configuring a time-frequency resource by the network device is improved, and a signal transmission delay is reduced.

In some possible implementations, the method further includes: determining a transmission mode of the first uplink data and the first uplink control information based on the capability information, where the transmission mode is that the first uplink data and the first uplink control information are separately transmitted, or that the first uplink data and the first uplink control information are transmitted after being multiplexed; and the determining a first time-frequency resource based on the capability information includes: determining the first time-frequency resource based on the capability information and the transmission mode.

The network device may further determine the transmission mode of the first uplink data and the first uplink control information based on the capability information, and then determine the first time-frequency resource based on the capability information and the transmission mode. In this way, the network device can further improve efficiency of configuring a time-frequency resource by the network device, and reduce a signal transmission delay.

In some possible implementations, the determining a transmission mode of the first uplink data and the first uplink control information based on the capability information includes: determining, based on the processing time period for the uplink data of the terminal device and the processing time period for the uplink control information of the terminal device, whether the terminal device is capable of obtaining a size of the first uplink control information of the terminal device before starting to process the first uplink data; and when determining that the terminal device is capable of obtaining the size of the first uplink control information before starting to process the first uplink data, determining that the transmission mode is that the first uplink data and the first uplink control information are transmitted after being multiplexed; or when determining that the terminal device is incapable of obtaining the size of the first uplink control information before starting to process the first uplink data, determining that the transmission mode is that the first uplink data and the first uplink control information are separately transmitted.

The network device may determine, based on the capability information of the terminal device, whether the terminal device is capable of obtaining the size of the uplink control information of the terminal device before starting to process the first uplink data, so as to determine the transmission mode of the first uplink data and the first uplink control information. If processing on the first uplink control information does not cause an increase in a processing time period for the first uplink data, a multiplexing transmission method may be used; or if processing on the first uplink control information causes an increase in a processing time period for the first uplink data, the first uplink control information and the first uplink data are not multiplexed, but are separately transmitted, thereby avoiding an increase in an uplink processing time period and reducing a signal transmission delay.

In some possible implementations, the determining the first time-frequency resource based on the capability information and the transmission mode includes: when the transmission mode is that the first uplink data and the first uplink control information are transmitted after being multiplexed, determining the first time-frequency resource based on the capability information, where the first time-frequency resource is used to carry the first uplink data and the first uplink control information that are multiplexed.

When the transmission mode is that the first uplink data and the first uplink control information are transmitted after being multiplexed, the network device may send the first signaling to indicate the first time-frequency resource. In this way, the network device can enable, by using the first signaling, the terminal device to send, on the first time-frequency resource, the first uplink data and first uplink control information that are multiplexed, thereby reducing signaling overheads.

In some possible implementations, the determining the first time-frequency resource based on the capability information and the transmission mode includes: when the transmission mode is that the first uplink data and the first uplink control information are transmitted after being multiplexed, determining the first time-frequency resource based on the capability information, where the first time-frequency resource is used to carry the first uplink data. The method further includes: determining a second time-frequency resource, where the second time-frequency resource is used to carry the first uplink control information, and the second time-frequency resource is the same as the first time-frequency resource; and sending second signaling to the terminal device, where the second signaling indicates the second time-frequency resource.

When the transmission mode is that the first uplink data and the first uplink control information are transmitted after being multiplexed, if the first time-frequency resource is used to carry the first uplink data, the network device may further determine the second time-frequency resource used to carry the uplink control information; and if the second time-frequency resource is the same as the first time-frequency resource, the network device may indicate the first time-frequency resource by using the first signaling and indicate the second time-frequency resource by using the second signaling, thereby improving indication flexibility.

In some possible implementations, the determining the first time-frequency resource based on the capability information and the transmission mode includes: when the transmission mode is that the first uplink data and the first uplink control information are transmitted after being multiplexed, determining the first time-frequency resource based on the capability information, where the first time-frequency resource is used to carry the first uplink control information. The method further includes: determining a second time-frequency resource, where the second time-frequency resource is used to carry the first uplink data, and the second time-frequency resource is the same as the first time-frequency resource; and sending second signaling to the terminal device, where the second signaling indicates the second time-frequency resource.

Alternatively, the first time-frequency resource may be used to carry the first uplink control information, and the second time-frequency resource is used to carry the first uplink data. The network device indicates the first time-frequency resource by using the first signaling, and indicates the second time-frequency resource by using the second signaling, thereby improving indication flexibility.

In some possible implementations, the method further includes: receiving, on the first time-frequency resource, the first uplink data and the first uplink control information that are multiplexed; or receiving the first uplink data or the first uplink control information on the first time-frequency resource.

If the terminal device is incapable of sending, on the first time-frequency resource, the first uplink data and the first uplink control information that are multiplexed, the terminal device may alternatively send the first uplink data or the first uplink control information on the first time-frequency resource, and the network device may alternatively receive the first uplink data or the first uplink control information sent by the terminal device. This can avoid a waste of resources and improve resource utilization. Specifically, after the network device fails to receive, on the first time-frequency resource, the first uplink data and the first uplink control information that are multiplexed, the network device may receive, through blind detection, the first uplink data or the first uplink control information sent by the terminal device.

In some possible implementations, the determining the first time-frequency resource based on the capability information and the transmission mode includes: when the transmission mode is that the first uplink data and the first uplink control information are separately transmitted, determining the first time-frequency resource based on the capability information, where the first time-frequency resource is used to carry the first uplink data. The method further includes: when the transmission mode is that the first uplink data and the first uplink control information are separately transmitted, determining the second time-frequency resource based on the capability information, where the second time-frequency resource is used to carry the first uplink control information, and the second time-frequency resource is different from the first time-frequency resource; and sending second signaling to the terminal device, where the second signaling is used to indicate the second time-frequency resource.

That the network device determines the first time-frequency resource based on the capability information and the transmission mode may be specifically: when the transmission mode is that the first uplink data and the first uplink control information are separately transmitted, determining the first time-frequency resource based on the capability information. In this way, the network device can determine the first time-frequency resource more accurately, thereby reducing a signal transmission delay, and improving resource allocation efficiency.

In some possible implementations, the determining the first time-frequency resource based on the capability information and the transmission mode includes: when the transmission mode is that the first uplink data and the first uplink control information are separately transmitted, determining the first time-frequency resource based on the capability information, where the first time-frequency resource is used to carry the first uplink control information. The method further includes: when the transmission mode is that the first uplink data and the first uplink control information are separately transmitted, determining the second time-frequency resource based on the capability information, where the second time-frequency resource is used to carry the first uplink data, and the second time-frequency resource is different from the first time-frequency resource; and sending second signaling to the terminal device, where the second signaling is used to indicate the second time-frequency resource.

When the transmission mode is that the first uplink data and the first uplink control information are separately transmitted, the network device may respectively indicate, by using the first signaling and the second signaling, the time-frequency resources that are used to carry the first uplink data and the first uplink control information, thereby improving indication flexibility.

In some possible implementations, that the second time-frequency resource is different from the first time-frequency resource is that the first time-frequency resource and the second time-frequency resource are in different symbols in a same slot, or that slots in which the first time-frequency resource and the second time-frequency resource are located are different, or that the first time-frequency resource and the second time-frequency resource are on different frequency domain resources in a same slot.

When the second time-frequency resource is different from the first time-frequency resource, a transmission delay for the first uplink data and a transmission delay for the first uplink control information can be further reduced.

In some possible implementations, that the first uplink data and the first uplink control information are multiplexed is that the first uplink data and the first uplink control information are multiplexed in a puncturing or rate matching manner.

The network device configures, for the terminal device, the time-frequency resources used to multiplex and transmit the first uplink data and the first uplink control information in the puncturing or rate matching manner, so that resource utilization can be improved.

In some possible implementations, the first uplink control information includes at least one of a first uplink acknowledgment signal and first uplink channel measurement information feedback information.

The first uplink control information in this application may include the first uplink acknowledgment signal, the first uplink channel measurement information feedback information, or a combination thereof, so that this embodiment of this application has a wide application scope and is highly adaptable.

According to a second aspect, a signal processing method is provided. The method includes: sending capability information to a network device, where the capability information includes a processing time period for processing uplink data by a terminal device and a processing time period for processing uplink control information by the terminal device; receiving first signaling, where the first signaling indicates a first time-frequency resource, and the first time-frequency resource is used to carry first uplink data and/or first uplink control information; and determining the first time-frequency resource based on the first signaling.

The terminal device sends, to the network device, the capability information that includes the uplink data and the uplink control information; receives the first signaling sent by the network device, where the first signaling indicates the first time-frequency resource used to carry the first uplink data and/or the first uplink control information, and the first time-frequency resource may be determined by the network device based on the capability information of the terminal device; and determines the first time-frequency resource based on the first signaling. In this way, a relatively long transmission delay or a scheduling failure for the first uplink data and/or the first uplink control information is avoided, that is, efficiency of configuring a time-frequency resource by the network device is improved, and a signal transmission delay is reduced.

In some possible implementations, the first time-frequency resource is used to carry the first uplink data; and the method further includes: receiving second signaling, where the second signaling indicates a second time-frequency resource, and the second time-frequency resource is used to carry the first uplink control information; and determining a transmission mode of the first uplink data and the first uplink control information based on the first signaling and the second signaling, where the transmission mode is that the first uplink data and the first uplink control information are separately transmitted, or that the first uplink data and the first uplink control information are transmitted after being multiplexed.

When the transmission mode is that the first uplink data and the first uplink control information are transmitted after being multiplexed, if the first time-frequency resource may be used to carry the first uplink data, the terminal device may further receive the second signaling, where the second signaling is used to indicate the second time-frequency resource carrying the first uplink control information. The terminal device receives the time-frequency resources that carry the first uplink data and the first uplink control information and that are respectively indicated by the network device by using the first signaling and the second signaling, thereby improving indication flexibility.

In some possible implementations, the first time-frequency resource is used to carry the first uplink control information; and the method further includes: receiving second signaling, where the second signaling indicates a second time-frequency resource, and the second time-frequency resource is used to carry the first uplink data; and determining a transmission mode of the first uplink data and the first uplink control information based on the first signaling and the second signaling, where the transmission mode is that the first uplink data and the first uplink control information are separately transmitted, or that the first uplink data and the first uplink control information are transmitted after being multiplexed.

When the transmission mode is that the first uplink data and the first uplink control information are transmitted after being multiplexed, if the first time-frequency resource may be used to carry the first uplink control information, the terminal device may further receive the second signaling, where the second signaling is used to indicate the second time-frequency resource carrying the first uplink data. The terminal device receives the time-frequency resources that carry the first uplink data and the first uplink control information and that are respectively indicated by the network device by using the first signaling and the second signaling, thereby improving indication flexibility.

In some possible implementations, the method further includes: when the first time-frequency resource is used to carry the first uplink data and the first uplink control information, determining that a transmission mode of the first uplink data and the first uplink control information is that the first uplink data and the first uplink control information are transmitted after being multiplexed.

The terminal device receives the first signaling, and the terminal device determines, based on the first signaling, that the first time-frequency resource is used to carry the first uplink data and the first uplink control information that are multiplexed, thereby reducing signaling overheads.

In some possible implementations, the determining a transmission mode of the first uplink data and the first uplink control information based on the first signaling and the second signaling includes: when the first time-frequency resource is the same as the second time-frequency resource, determining that the transmission mode is that the first uplink data and the first uplink control information are transmitted after being multiplexed; or when the first time-frequency resource is different from the second time-frequency resource, determining that the transmission mode is that the first uplink data and the first uplink control information are separately transmitted.

When receiving the two types of signaling, the terminal device may determine the transmission mode of the first uplink data and the first uplink control information depending on whether the time-frequency resource indicated by the first signaling is the same as the time-frequency resource indicated by the second signaling, so as to further improve signal transmission accuracy.

In some possible implementations, when it is determined that the transmission mode is that the first uplink data and the first uplink control information are transmitted after being multiplexed, the method further includes: determining whether a size of the first uplink control information is obtained before the first uplink data starts to be processed; and when the terminal device obtains the size of the first uplink control information before starting to process the first uplink data, sending, on the first time-frequency resource, the first uplink data and the first uplink control information that are multiplexed.

When it is determined that the transmission mode is that the first uplink data and the first uplink control information are transmitted after being multiplexed, the terminal device may determine whether the size of the first uplink control information is obtained before the first uplink data starts to be processed; and determine, depending on whether the size of the first uplink control information is obtained before the first uplink data starts to be processed, a type of a signal sent on the first time-frequency resource. If obtaining the size of the first uplink control information before the first uplink data starts to be processed, the terminal device sends, on the first time-frequency resource, the first uplink data and the first uplink control information that are multiplexed. In this way, a signal transmission delay is reduced.

In some possible implementations, when it is determined that the transmission mode is that the first uplink data and the first uplink control information are transmitted after being multiplexed, the method further includes: determining whether a size of the first uplink control information is obtained before the first uplink data starts to be processed; and when the terminal device does not obtain the size of the first uplink control information before starting to process the first uplink data, sending the first uplink data or the first uplink control information on the first time-frequency resource.

If the terminal device does not obtain the size of the first uplink control information before starting to process the first uplink data, processing on the first uplink data by the terminal device may cause a failure in uplink transmission due to limitation by processing on the first uplink control information; in this case, the terminal device chooses to send the first uplink data or the first uplink control information on the first time-frequency resource. This avoids a waste of uplink transmission resources, and further improves resource utilization.

In some possible implementations, that the first time-frequency resource is different from the second time-frequency resource is that the first time-frequency resource and the second time-frequency resource are in different symbols in a same slot, or that slots in which the first time-frequency resource and the second time-frequency resource are located are different, or that the first time-frequency resource and the second time-frequency resource are on different frequency domain resources in a same slot.

When the time-frequency resource indicated by the first signaling is different from the time-frequency resource indicated by the second signaling, a transmission delay for the first uplink data and a transmission delay for the first uplink control information can still be further reduced through separate transmission.

In some possible implementations, that the first uplink data and the first uplink control information are multiplexed is that the first uplink data and the first uplink control information are multiplexed in a puncturing or rate matching manner.

The terminal device transmits, based on the time-frequency resources configured by the network device in the puncturing or rate matching manner, the first uplink data and the first uplink control information that are multiplexed, so that resource utilization can be improved.

In some possible implementations, the first uplink control information includes at least one of a first uplink acknowledgment signal and first uplink channel measurement information feedback information.

The first uplink control information in this application may include the first uplink acknowledgment signal, the first uplink channel measurement information feedback information, or a combination thereof, so that this embodiment of this application has a wide application scope and is highly adaptable.

According to a third aspect, a signal processing apparatus is provided. The apparatus may be a network device, or may be a chip in a network device. The apparatus has functions of implementing the embodiments of the first aspect. The functions may be implemented by hardware, or may be implemented by hardware executing corresponding software. The hardware or the software includes one or more units corresponding to the foregoing functions.

In a possible design, when the apparatus is a network device, the network device includes a processing unit and a transceiver unit. The processing unit may be, for example, a processor. The transceiver unit may be, for example, a transceiver, and the transceiver includes a radio frequency circuit. Optionally, the network device further includes a storage unit, and the storage unit may be, for example, a memory. When the network device includes a storage unit, the storage unit is configured to store a computer executable instruction. The processing unit is connected to the storage unit. The processing unit executes the computer executable instruction stored in the storage unit, to enable the network device to perform the signal processing method in any design of the first aspect.

In another possible design, when the apparatus is a chip in a network device, the chip includes a processing unit and a transceiver unit. The processing unit may be, for example, a processor, and the transceiver unit may be, for example, an input/output interface, a pin, or a circuit of the chip. The processing unit may execute the computer executable instruction stored in the storage unit, to enable the chip in the terminal to perform the signal processing method in any design of the first aspect. Optionally, the storage unit is a storage unit in the chip, such as a register or a buffer; or the storage unit may be a storage unit located in the network device but outside the chip, such as a read-only memory (read-only memory, ROM), another type of static storage device capable of storing static information and instructions, or a random access memory (random access memory, RAM).

Any one of the foregoing processors may be a general-purpose central processing unit (CPU), a microprocessor, an application-specific integrated circuit (application-specific integrated circuit, ASIC), or one or more integrated circuits configured to control program execution of the signal processing method in the first aspect.

According to a fourth aspect, this application provides a signal processing apparatus. The apparatus may be a terminal device, or may be a chip in a terminal device. The apparatus has functions of implementing the embodiments of the second aspect. The functions may be implemented by hardware, or may be implemented by hardware executing corresponding software. The hardware or the software includes one or more units corresponding to the foregoing functions.

In a possible design, when the apparatus is a terminal device, the terminal device includes a processing unit and a transceiver unit. The processing unit may be, for example, a processor. The transceiver unit may be, for example, a transceiver, and the transceiver includes a radio frequency circuit. Optionally, the terminal device further includes a storage unit, and the storage unit may be, for example, a memory. When the terminal device includes a storage unit, the storage unit is configured to store a computer executable instruction. The processing unit is connected to the storage unit. The processing unit executes the computer executable instruction stored in the storage unit, to enable the terminal device to perform the signal processing method in any design of the second aspect.

In another possible design, when the apparatus is a chip in a terminal device, the chip includes a processing unit and a transceiver unit. The processing unit may be, for example, a processor. The transceiver unit may be, for example, an input/output interface, a pin, or a circuit of the chip. The processing unit may execute a computer executable instruction stored in a storage unit, to enable the chip in the terminal device to perform the signal processing method in any design of the second aspect. Optionally, the storage unit is a storage unit in the chip, for example, a register or a cache. The storage unit may alternatively be a storage unit located in the terminal device but outside the chip, for example, a ROM, another type of static storage device that can store static information and an instruction, or a RAM.

Any one of the foregoing processors may be a CPU, a microprocessor, an ASIC, or one or more integrated circuits configured to control program execution of the signal processing method in the second aspect.

According to a fifth aspect, a communications system is provided. The communications system includes the apparatus in the third aspect and the apparatus in the fourth aspect.

According to a sixth aspect, a computer storage medium is provided. The computer storage medium stores program code, and the program code includes an instruction used to instruct to perform the method in any one of the first aspect, the second aspect, or any possible implementation thereof.

According to a seventh aspect, a computer program product including an instruction is provided. When the computer program product is run on a computer, the computer is enabled to perform the method in any one of the first aspect, the second aspect, or any possible implementation thereof.

Based on the foregoing solutions, the network device determines, based on the capability information that includes the processing time period for the uplink data of the terminal device and the processing time period for the uplink control information of the terminal device, the first time-frequency resource used to carry the first uplink data and/or the first uplink control information, and sends the first signaling to the terminal device to indicate the first time-frequency resource. In this way, a relatively long transmission delay or a scheduling failure for the first uplink data and/or the first uplink control information is avoided, that is, efficiency of configuring a time-frequency resource by the network device is improved, and a signal transmission delay is reduced.

DESCRIPTION OF EMBODIMENTS

Figure 1:
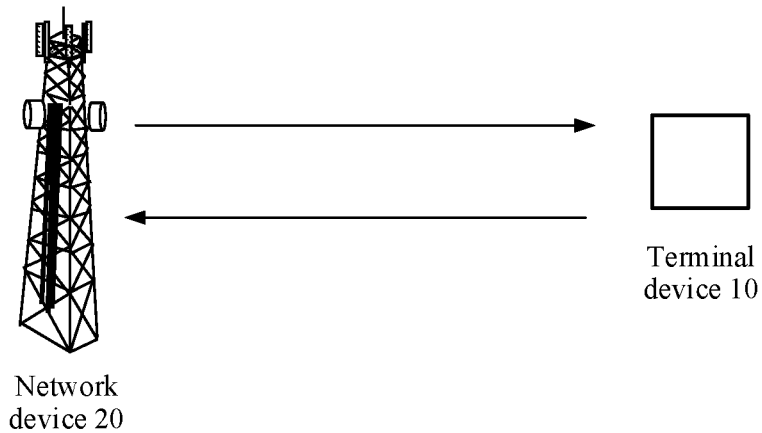
FIG. 1 is a schematic diagram of a communications system according to an embodiment of this application.

The following describes technical solutions of this application with reference to accompanying drawings.

The technical solutions of the embodiments of this application may be applied to various communications systems, such as a global system for mobile communications (global system of mobile communication, GSM), a code division multiple access (code division multiple access, CDMA) system, a wideband code division multiple access (wideband code division multiple access, WCDMA) system, a general packet radio service (general packet radio service, GPRS), a long term evolution (long term evolution, LTE) system, an LTE frequency division duplex (frequency division duplex, FDD) system, an LTE time division duplex (time division duplex, TDD), a universal mobile telecommunications system (universal mobile telecommunication system, UMTS), a worldwide interoperability for microwave access (worldwide interoperability for microwave access, WiMAX) communications system, a future fifth generation (5th generation, 5G) system, and a new radio (new radio, NR) system.

A terminal device in the embodiments of this application may be referred to as user equipment, an access terminal, a subscriber unit, a subscriber station, a mobile station, a mobile console, a remote station, a remote terminal, a mobile device, a user terminal, a terminal, a wireless communications device, a user agent, a user apparatus, or the like; or may be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a terminal device in a future 5G network, a terminal device in a future evolved public land mobile network (public land mobile network, PLMN), or the like. This is not limited in the embodiments of this application.

A network device in the embodiments of this application may be a device configured to communicate with the terminal device. The network device may be a base transceiver station (base transceiver station, BTS) in the global system for mobile communications (global system of mobile communication, GSM) or the code division multiple access (Code Division Multiple Access, CDMA), or may be a NodeB (NodeB, NB) in the wideband code division multiple access (wideband code division multiple access, WCDMA) system, or may be an evolved NodeB (evolutional NodeB, eNB or eNodeB) in the LTE system, or may be a radio controller in a scenario of a cloud radio access network (cloud radio access network, CRAN). Alternatively, the network device may be a relay node, a radio access point, a transceiver station, a transmission point, a vehicle-mounted device, a wearable device, a network device in a future 5G network, a network device in a future evolved PLMN network, or the like. This is not limited in the embodiments of this application.

FIG. 1 is a schematic diagram of a communications system according to an embodiment of this application. The communications system in FIG. 1 may include at least one terminal device 10 and a network device 20. The network device 20 is configured to provide a communications service for each terminal device 10 and access a core network. An arrow shown in FIG. 1 may represent uplink/downlink transmission performed by using a link between the terminal device 10 and the network device 20. A communications link used by the network device 20 for sending and used by the terminal device 10 for reception is downlink transmission, and a communications link used by the terminal device 10 for sending and used by the network device 20 for reception is uplink transmission.

A conventional wireless cellular communications system includes a network device and a terminal device. Transmission from the terminal device to the network device is referred to as uplink transmission, transmission from the network device to the terminal device is referred to as downlink transmission, and specific uplink signals sent by the terminal device on corresponding uplink time-frequency resources are usually specified by the network device. Specifically, the network device sends uplink scheduling signaling. The uplink scheduling signaling is used to notify the terminal device of specific time-frequency resources on which uplink data is sent. After receiving the uplink scheduling signaling, the terminal device generates an uplink data packet as instructed by the uplink scheduling signaling, and sends the uplink data on the scheduled time-frequency resources. Uplink scheduling sent by the network device to the terminal device is carried on a physical downlink control channel (physical downlink control channel, PDCCH), and is one type of downlink control signaling (downlink control information, DCI). In addition, the network device further sends some channel state information reference signals (channel state information-reference signal, CSI-RS) used for channel state measurement. The terminal device measures these reference signals to obtain channel state information, including a channel quality indicator (channel quality indicator, CQI), a rank indicator (rank indication, RI), and precoding matrix information (proceeding matrix indicator, PMI). The terminal device sends channel state measurement feedback information to the network device by using an uplink signal. The network device further sends a synchronization signal on a synchronization channel (synchronization channel), and sends a broadcast signal on a physical broadcast channel (physical broadcast channel). The terminal device may further measure the synchronization signal to obtain the channel state information. In a previous conventional cellular communications system, a terminal receives uplink scheduling information in the $n^{th}$ subframe, and sends uplink data in the $(n+4)^{th}$ subframe or after the $(n+4)^{th}$ subframe. A time period for processing the uplink data is at least approximately four subframes, and duration of each subframe is 1 ms. For channel measurement, a CSI-RS is sent in the $n^{th}$ subframe, and channel measurement feedback information specific to the CSI-RS is sent in the $(n+4)^{th}$ subframe or after the $(n+4)^{th}$ subframe. If the uplink data and the channel measurement feedback information are sent in a same subframe, some resources scheduled for uplink data transmission are reserved to transmit the channel measurement feedback information. This is referred to as multiplexing transmission of the uplink data and the channel measurement feedback information. In view of this, the terminal needs to perform puncturing and rate matching on the uplink data. In this case, before processing the uplink data, the terminal needs to learn whether a resource in the scheduled uplink resources needs to be reserved for a channel measurement feedback. In an existing cellular communications system, a terminal learns, approximately 4 ms in advance, whether uplink data and a channel measurement feedback are multiplexed. In this case, before performing uplink rate matching, the terminal may learn whether a resource in scheduled uplink transmission needs to be reserved for the channel measurement feedback, processing on the channel measurement feedback information does not cause an uplink data processing problem. Therefore, in the conventional cellular system, during scheduling, the network device does not specially consider impact of a channel measurement feedback time period on uplink transmission processing.

In a new wireless communications system, a plurality of delay reduction requirements are proposed to improve user experience. Implementation of a low delay is embodied mainly in two aspects: a low delay in data transmission and a low delay in channel quality feedback.

Using a 3GPP long term evolution (long term evolution, LTE) system or a new radio (new radio, NR) system as an example, in uplink transmission, the terminal device is required to quickly send uplink data after receiving uplink data scheduling signaling from a network, to reduce a data transmission delay. In the NR system, an uplink processing time period is required to be low to several symbols, for example, N2 symbols, and a channel that carries the uplink data is referred to as a physical uplink shared channel (physical uplink shared channel, PUSCH). When the network device sends a downlink reference signal to trigger the terminal device to periodically or aperiodically measure a channel status and report channel state measurement information to the network device as soon as possible, to shorten a channel quality feedback time period. In the NR system, a processing time period for the channel measurement feedback information may be several OFDM symbols to several slots based on different measurement requirements. It is assumed that the processing time period is K1 symbols. In addition, the network device sends downlink data and a PDSCH to the terminal device, and requires the terminal device to quickly process the downlink data and feed back, to the terminal device, information indicating whether the downlink data is successfully received. A feedback signal is referred to as an ACK signal/a NACK signal. In the NR system, a downlink processing time period is required to be low to several symbols, for example, N1 symbols. The downlink reference signal may be a channel state information reference signal (channel state information reference signal, CSI-RS), and the channel state measurement information includes at least one of a channel quality indicator (channel quality indicator, CQI), a precoding matrix indicator (precoding matrix indicator, PMI), and a rank indicator (rank indicator, RI). In addition, the channel state measurement information may also be referred to as uplink control information (uplink control information, UCI), and a channel that carries the uplink control information is referred to as a physical uplink control channel (physical uplink control channel, PUCCH).

The uplink data and the uplink control information may be separately transmitted, and different time-frequency resources are allocated to the uplink data carried on the physical uplink shared channel (physical uplink shared channel, PUSCH) and the UCI carried on the physical uplink control channel, to perform separate transmission; or the uplink data and the UCI may be transmitted on a time-frequency resource after being multiplexed.

Figure 2:
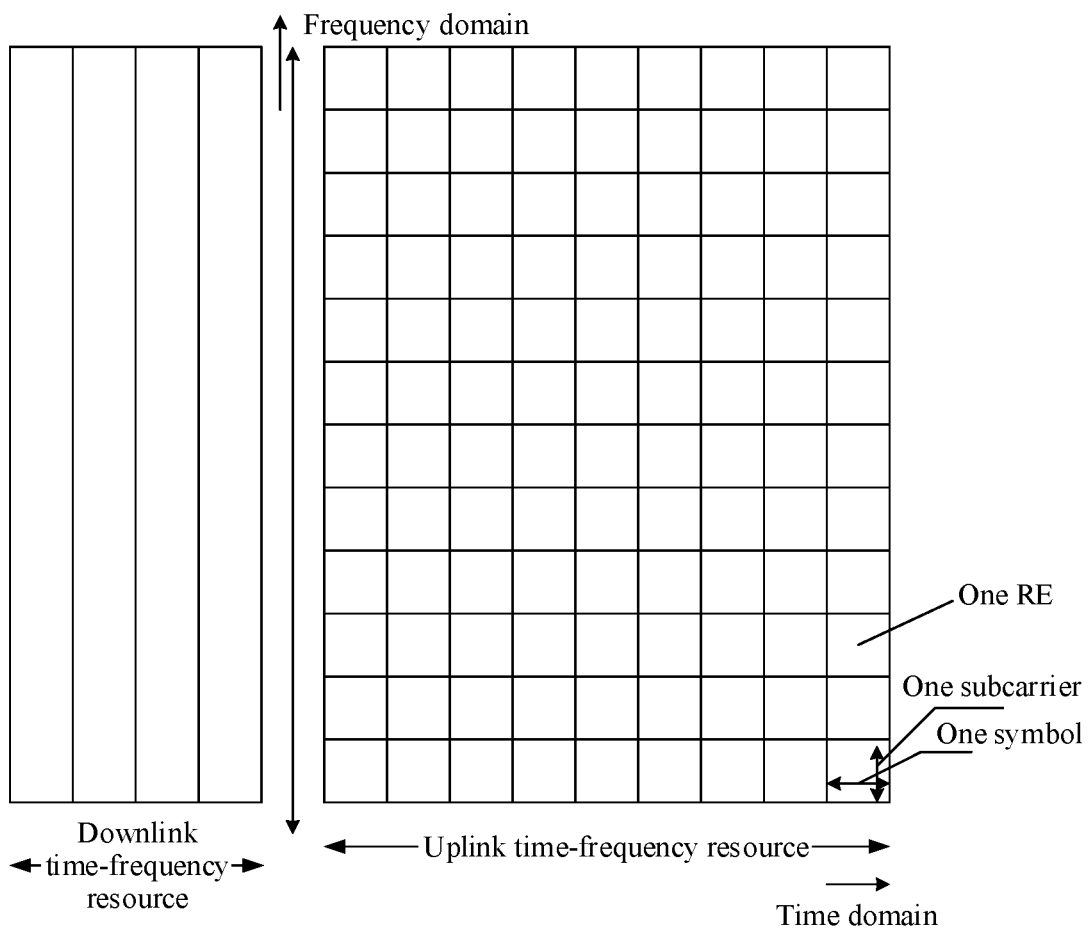
FIG. 2 is a schematic diagram of a time-frequency resource according to an embodiment of this application.
Figure 3:
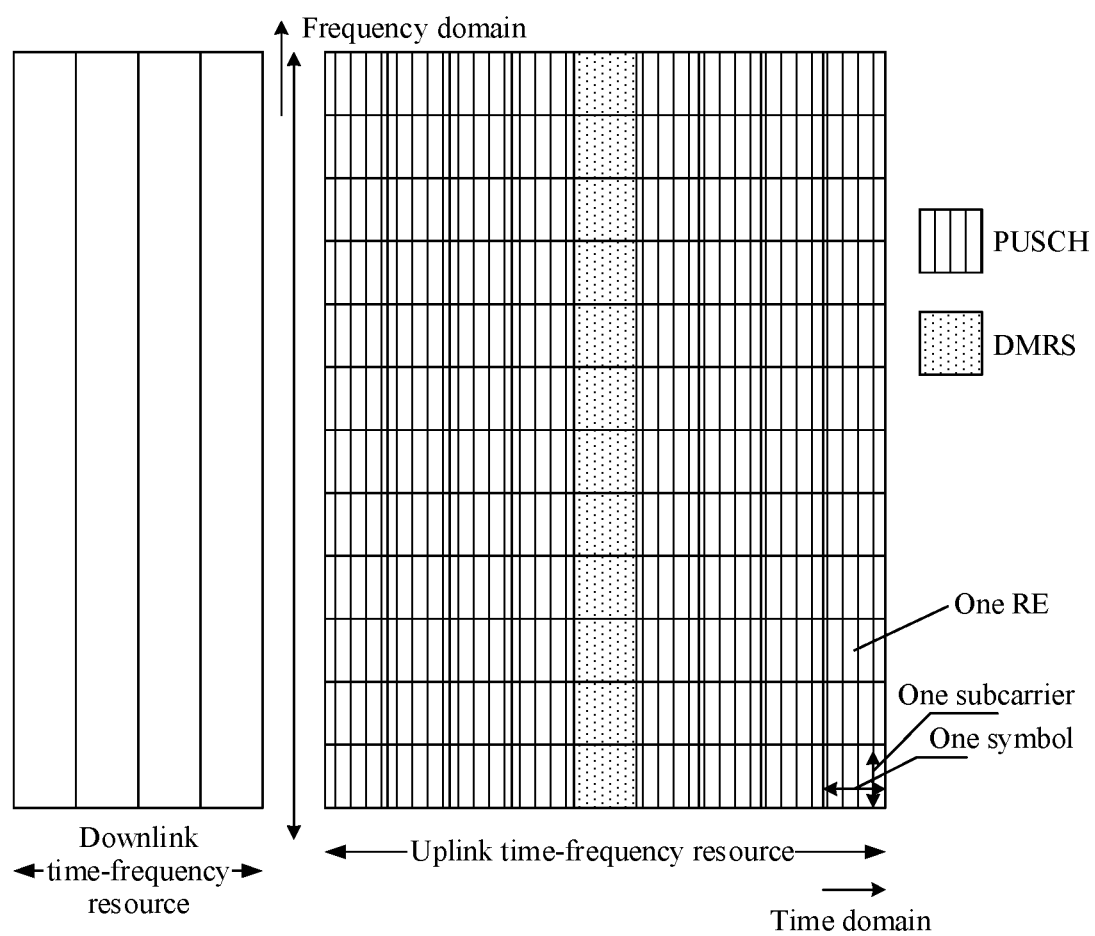
FIG. 3 is a schematic diagram of occupation of time-frequency resources that are separately transmitted according to an embodiment of this application.
Figure 4:
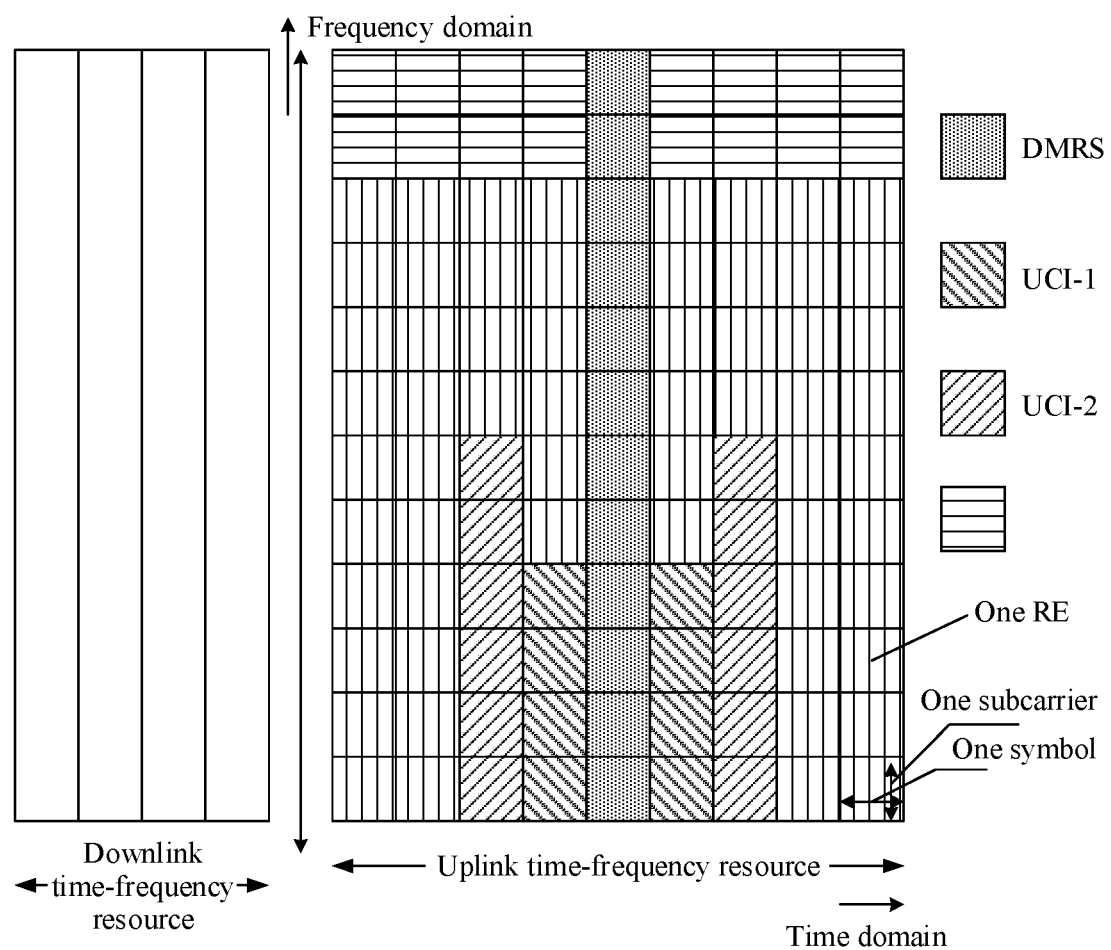
FIG. 4 is a schematic diagram of occupation of time-frequency resources that are transmitted after being multiplexed according to an embodiment of this application.

Specifically, the network device allocates a time-frequency resource to the PUSCH. The time-frequency resource includes at least one symbol in time and at least one subcarrier in frequency, as shown in FIG. 2. When the uplink data is separately transmitted, all time-frequency resources are used to carry the uplink data, as shown in FIG. 3. When the uplink data and the UCI are multiplexed for transmission, some of time-frequency resources allocated by the network device to the PUSCH are used to carry the UCI, as shown in FIG. 4. Therefore, rate matching or puncturing needs to be performed on the uplink data, and some resources are reserved to carry the UCI. When rate matching is performed on the uplink data, a quantity of time-frequency resources reserved for UCI mapping needs to be learned. In other words, a size of the UCI multiplexed with the uplink data needs to be learned, and the size of the uplink UCI changes based on factors such as a channel status and an amount and a type of UCI that needs to be multiplexed, for example, based on a value, obtained by the terminal device by measuring the CSI-RS, of a rank indicator (Rank Indication, RI) of a current channel. Therefore, an operation related to uplink rate matching by the terminal device may be started only after the size of the UCI multiplexed with the uplink data is obtained, resulting in an increased processing time period for transmitting uplink data by the terminal device.

Figure 5:
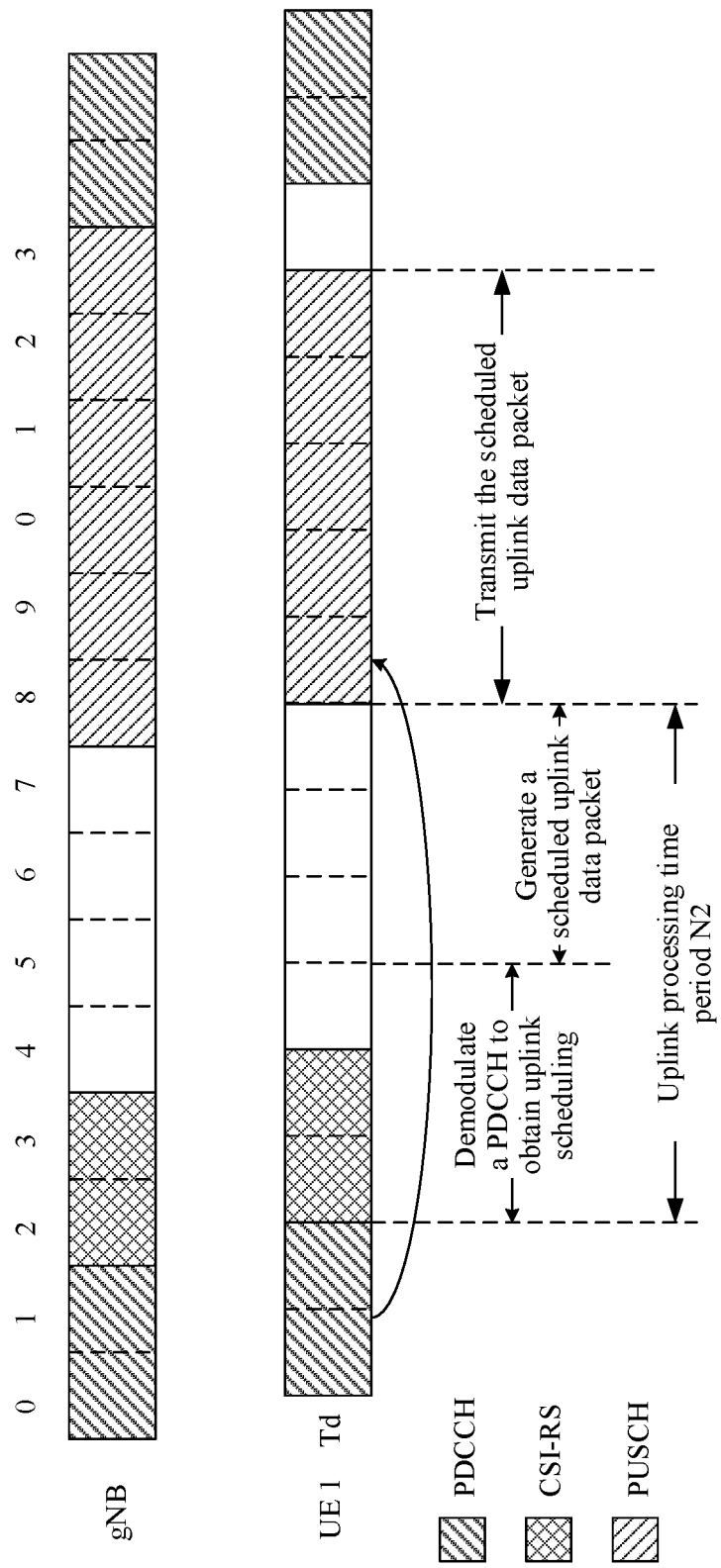
FIG. 5 is a schematic diagram of transmission after multiplexing.

For example, as shown in FIG. 5, if data does not need to be multiplexed with UCI, after receiving uplink scheduling signaling that is sent by the network device and that is carried on a PDCCH, the terminal device can start to process the uplink data, and generate an uplink data packet. In addition, when an allocated uplink time-frequency resource arrives, the carried and scheduled uplink data is sent. The uplink processing time period N2 is defined as a minimum processing time period between the end of a last symbol for the PDCCH carrying the uplink scheduling signaling and a time point at which uplink data scheduled by using the uplink scheduling signaling starts to be transmitted, is expressed in a quantity of OFDM symbols, and may be any nonnegative number greater than zero.

Figure 6:
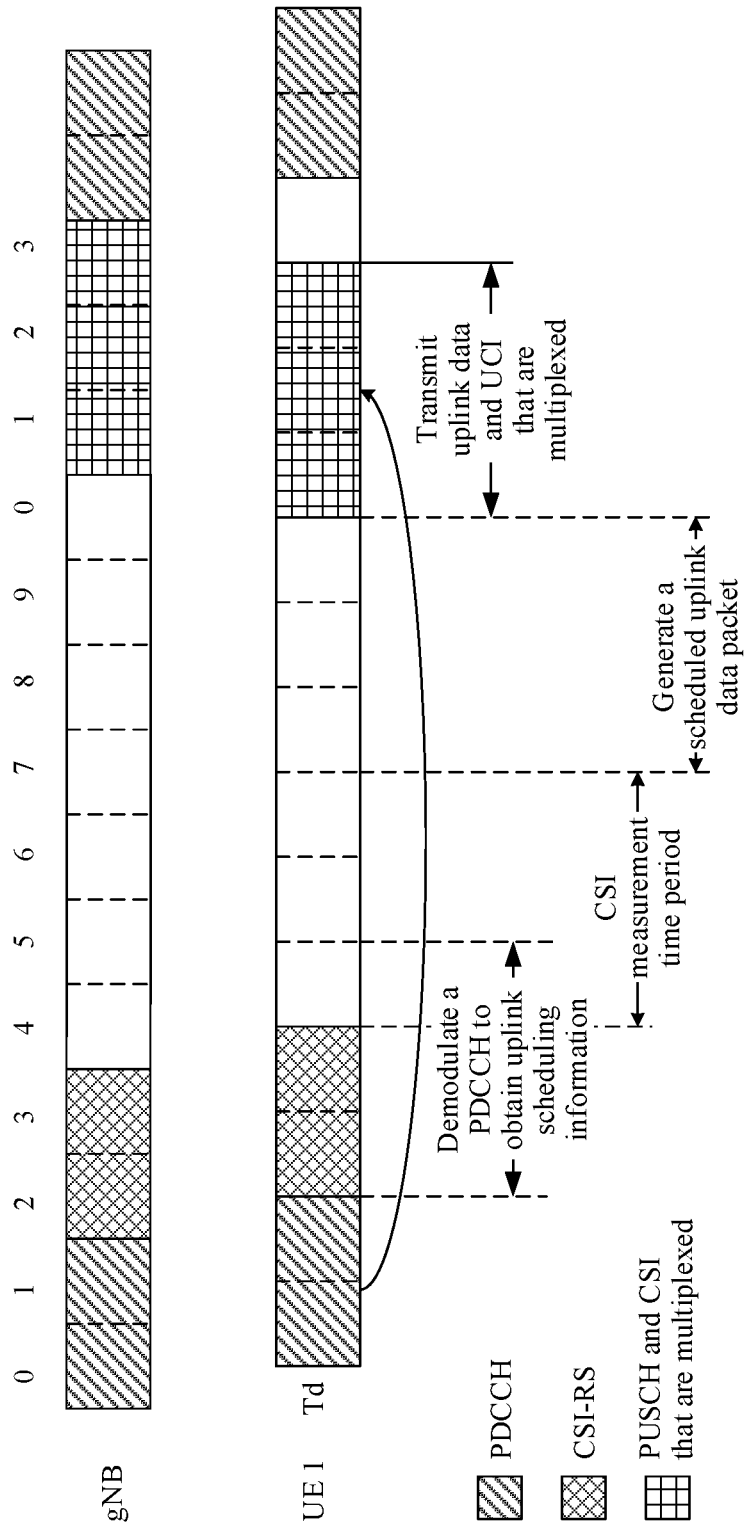
FIG. 6 is a schematic diagram of separate transmission of uplink data.

For example, as shown in FIG. 6, if the uplink data and the UCI are to be transmitted after being multiplexed, for example, the uplink data and channel measurement feedback information are to be multiplexed, after receiving uplink scheduling signaling carried on the PDCCH, the terminal device can start rate matching-related processing only when learning the size of the to-be-multiplexed UCI. For example, uplink rate matching-related processing can be started only when the terminal device obtains an RI by measuring a channel state information reference signal (channel state information reference signal, CSI-RS) and then obtains, based on the RI, the size of the UCI multiplexed with the uplink data; and further an uplink data packet is generated. During such scheduling, if the base station performs scheduling in consideration of a processing time period for the multiplexed UCI, a longer time period in uplink processing needs to be reserved for UCI processing, increasing a transmission delay and reducing spectral efficiency. If the base station schedules the uplink data to be multiplexed with the UCI, without considering a processing time period for the multiplexed UCI, a scheduling failure may even be caused because the terminal has no sufficient time to process the uplink data.

If the network device sends the uplink scheduling signaling in a slot n, the scheduling signaling requires the terminal device to send the uplink data in the slot n, and the network device sends the CSI-RS in the slot n, and schedules the terminal device to multiplex and transmit data in the slot n and channel measurement feedback information specific to the CSI-RS. In this case, the terminal device can start some uplink processing only after processing on the channel measurement feedback information is completed. For example, uplink rate matching parameter calculation and uplink data rate matching can be performed only after a size of the channel measurement feedback information is obtained. Consequently, an uplink processing time period is increased, and even a scheduling failure is caused because the terminal device cannot complete uplink processing before uplink transmission required by the network device.

Figure 7:
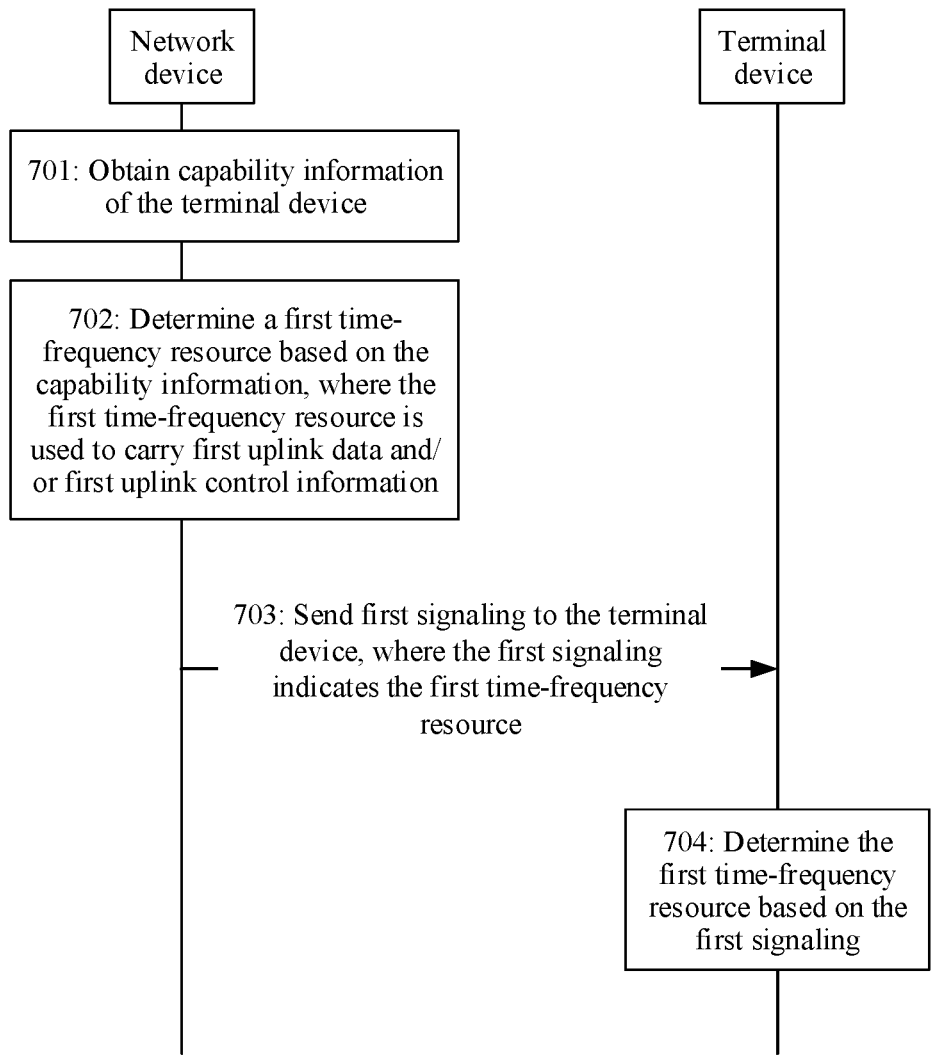
FIG. 7 is a schematic flowchart of a signal processing method according to an embodiment of this application.

FIG. 7 shows a signal processing method according to an embodiment of this application.

701: A network device obtains capability information of a terminal device, where the capability information includes at least one processing time period for uplink data of the terminal device and at least one processing time period for uplink control information UCI of the terminal device. Correspondingly, the terminal device sends the capability information.

It should be noted that the terminal device may report the capability information proactively, for example, reporting the capability information periodically. For example, the terminal device reports the terminal capability information to the network device periodically (for example, every 640 ms or 320 ms, where a specific time period may be agreed on based on implementation or configured by the network device); or reports the terminal capability information by triggering an event. For example, the terminal device reports the terminal capability information to the network device when initially accessing a network. Alternatively, the network device may proactively obtain the capability information, for example, send signaling to trigger the terminal device to report the capability information. Alternatively, the network device may obtain the capability information of the terminal device by using a core network device, another base station, or the like. This application is not limited thereto.

Optionally, the processing time period for the uplink data of the terminal device is defined as a shortest time period between an end time point for a PDCCH that carries uplink scheduling signaling and a start time point at which the scheduled uplink data is sent.

Optionally, there is one or more processing time periods for the uplink data of the terminal device, to indicate processing time periods of the terminal device under different conditions. For example, if the terminal device has different processing time periods specific to different subcarrier spacings, the processing time periods for the uplink data of the terminal device include values specific to the different subcarrier spacings. Alternatively, for example, if the terminal device has different processing time periods specific to different transmission bandwidths, the processing time periods for the uplink data of the terminal device include values specific to the different transmission bandwidths. Alternatively, for example, if the terminal device has different processing time periods specific to different uplink transmission rates, the processing time periods for the uplink data of the terminal device include values specific to the different transmission rates. The uplink processing time periods of the terminal device may alternatively have different values due to impact of a size of an uplink data packet, an uplink data mapping mode, an uplink pilot mapping mode, a PDCCH transmission mode, or the like. This application is not limited thereto.

Optionally, the processing time period for the uplink data of the terminal device includes at least one of: a processing time period for obtaining uplink scheduling information by the terminal device (including time periods for demodulating the PDCCH carrying the uplink scheduling information, obtaining DCI through blind detection, and parsing the DCI to obtain the uplink scheduling information), a time period for generating a to-be-transmitted uplink data transport block (TB) based on a manner indicated by uplink scheduling, a time period for calculating parameters used for uplink data encoding and rate matching, a time period for encoding an uplink data transport block, a time period for performing uplink data rate matching, a time period for precoding uplink data, a time period for demodulating the uplink data, and the like.

Optionally, the uplink control information of the terminal device includes at least one of: feedback information used to feed back that the terminal device receives a physical downlink shared channel (physical downlink shared channel, PDSCH) and sends an uplink acknowledgment signal ACK/NACK, channel measurement feedback information and/or beam information obtained after the terminal device receives a downlink CSI-RS and/or a downlink synchronization signal block (synchronization signal block), uplink scheduling request (schedule request, SR) information of the terminal, and the like. The downlink synchronization signal block includes at least one of a primary synchronization channel (primary synchronization channel, PSCH), a secondary synchronization channel (secondary synchronization channel, SSCH), and a physical broadcast channel (physical broadcast channel, PBCH).

Optionally, the processing time period for the uplink control information of the terminal device includes at least one of a processing time period for the acknowledgment signal ACK/NACK of the terminal device and a processing time period for the channel measurement feedback information of the terminal device.

Optionally, the processing time period for the acknowledgment signal ACK/NACK of the terminal device is a processing time period between receiving a downlink physical data channel and sending the acknowledgment signal ACK/NACK. For example, the processing time period is defined as a minimum time period between an end time point at which the terminal device receives a PDSCH carrying downlink data and a time point at which the terminal device starts to send feedback information specific to the ACK/NACK of the downlink data.

Optionally, the processing time period for the channel measurement feedback information of the terminal device includes at least one of: a processing time period between receiving, by the terminal device, the downlink CSI-RS and obtaining the channel measurement feedback information and/or the beam information, and a processing time period between receiving, by the terminal device, the downlink synchronization signal block and obtaining the channel measurement feedback information and/or the beam information.

Optionally, the processing time period between receiving, by the terminal device, the downlink CSI-RS and obtaining the channel measurement feedback information and/or the beam information is defined as a shortest time period between an end time point at which the terminal device receives the to-be-measured CSI-RS and a time point at which the terminal device obtains the channel measurement feedback information and/or the beam information.

Optionally, the processing time period for the channel measurement feedback information of the terminal device includes at least one of: a processing time period for measuring a rank indicator (RI) by the terminal device, a processing time period for measuring channel quality information by the terminal device, and a processing time period for measuring precoding matrix information (PMI) by the terminal device.

Optionally, the processing time period for the channel measurement feedback information of the terminal device has different values under different conditions. For example, the terminal device has different processing time periods specific to different subcarrier spacings, different processing time periods specific to different measurement bandwidths, different processing time periods specific to different measurement configurations, different processing time periods specific to different measurement channels (optionally, the measurement channel may be at least one of a CSI-RS, a common reference signal CRS, or a synchronization signal), different processing time periods specific to different measurement targets (where the measurement target includes at least one of a CQI, a PMI, an RI, beam management, and mobility management), different processing time periods specific to different measurement precision, or different processing time periods specific to different measurement antenna port configurations.

702: The network device determines a first time-frequency resource based on the capability information, where the first time-frequency resource is used to carry first uplink data and/or first uplink control information.

The network device determines that uplink data or uplink control information needs to be scheduled for transmission. In this embodiment of this application, the to-be-scheduled uplink data is referred to as the first uplink data, and the to-be-scheduled uplink control information is referred to as the first uplink control information. Optionally, the first uplink control information may include at least one piece of uplink control information, the uplink control information may be uplink ACK/NACK feedback information, channel measurement feedback information, scheduling request information, or the like, and the channel measurement feedback information may include a CQI, a PMI, an RI, or the like.

Optionally, the network device determines the first time-frequency resource based on the capability information. The first time-frequency resource may be used to carry the first uplink data.

Optionally, the network device determines the first time-frequency resource based on the capability information. The first time-frequency resource may alternatively be used to carry the first uplink control information.

Optionally, the network device determines the first time-frequency resource based on the capability information. The first time-frequency resource may alternatively be used to carry the first uplink data and the first uplink control information.

When the network device needs to schedule the first uplink data and/or the first uplink control information UCI to be transmitted, the network device may determine, based on the processing time period for the uplink data of the terminal device and the processing time period for the uplink control information of the terminal device, the time-frequency resource carrying the scheduled first uplink data and/or the time-frequency resource carrying the scheduled first uplink control information, to avoid an increase, caused by mutual coupling between processing on the first uplink data and processing on the first uplink control information, in a transmission delay for the first uplink data and/or the first uplink control information. This improves spectral efficiency, and avoids a scheduling failure caused because the terminal has no sufficient time to perform processing.

Figure 8:
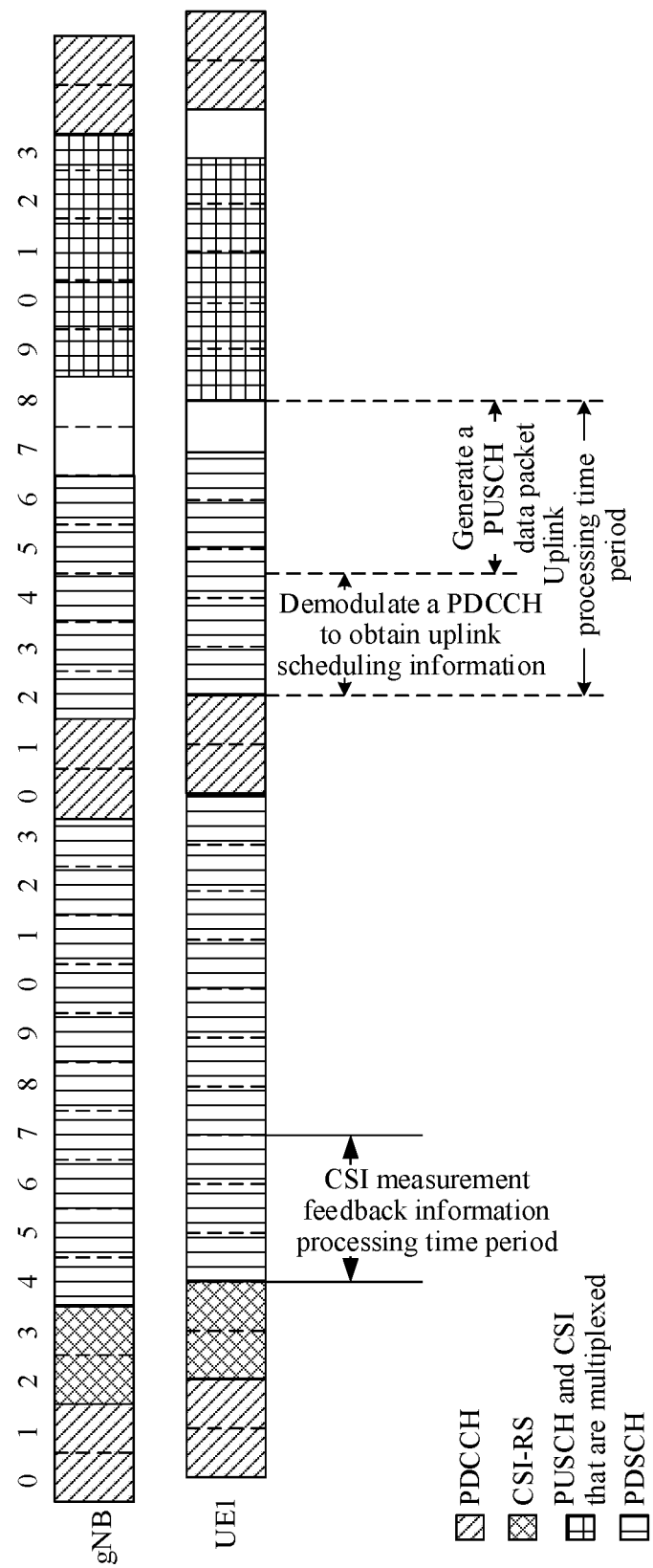
FIG. 8 is a schematic diagram of a signal processing method according to another embodiment of this application.

For example, as shown in FIG. 8, when the terminal device needs to schedule the first uplink data to be transmitted in a slot n, and schedule first channel measurement feedback information to be transmitted in the slot n, the network device estimates, based on the capability information of the terminal device, for example, a processing time period for channel measurement feedback information, a time period between a time point at which the terminal device completes CSI-RS receiving and a time point at which the terminal device completes processing on corresponding channel measurement feedback information. If the network device estimates that the terminal device can obtain, before starting to process the first uplink data, a size of the channel measurement feedback information to be transmitted in the slot n, the network device may configure the first uplink data and the first channel measurement feedback information to be multiplexed and transmitted in the slot n.

Figure 9:
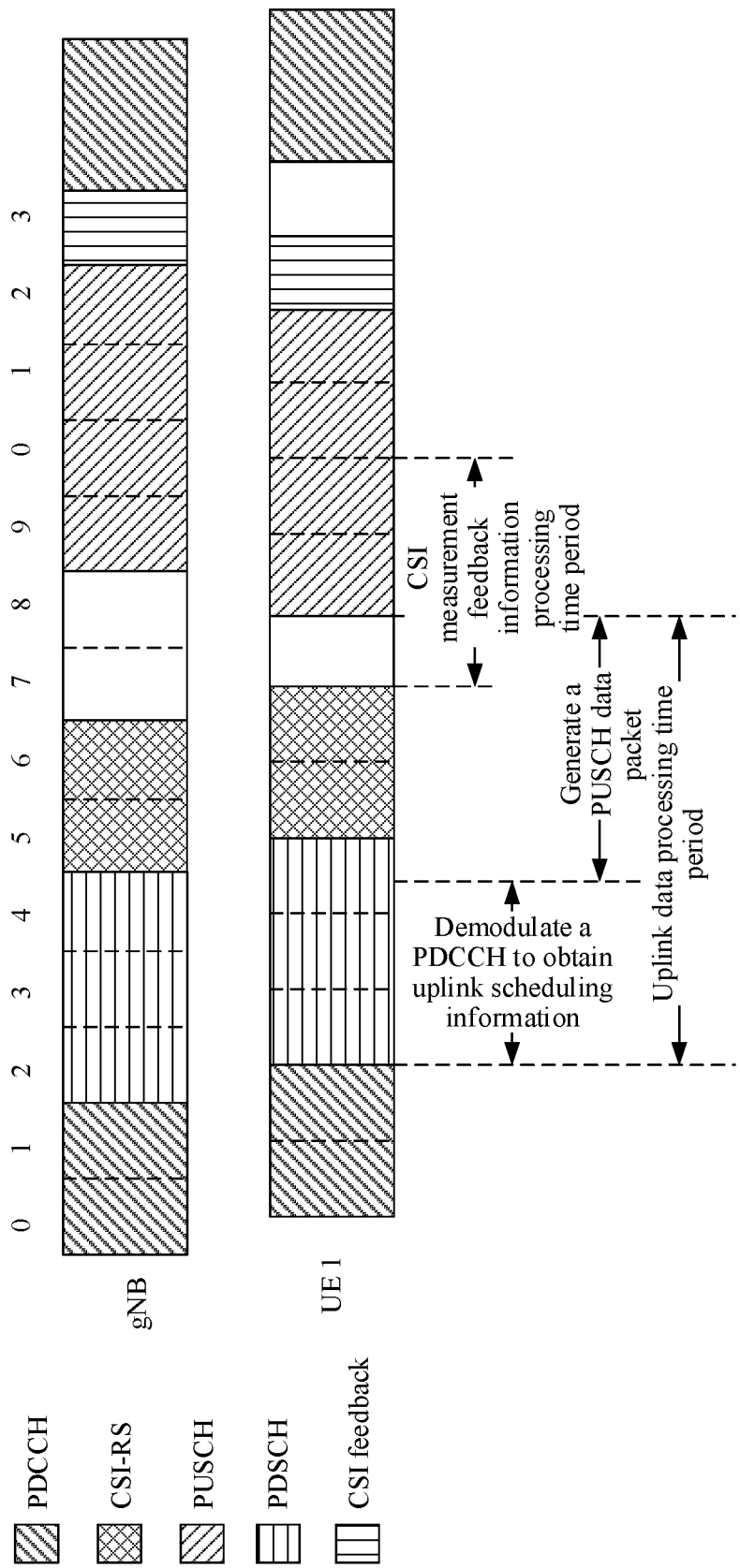
FIG. 9 is a schematic diagram of a signal processing method according to another embodiment of this application.

For example, as shown in FIG. 9, when the terminal device needs to schedule the first uplink data to be transmitted in a slot n and schedule first channel measurement feedback information to be transmitted in the slot n, the network device estimates, based on the capability information of the terminal device, for example, a processing time period for channel measurement feedback information, a time period between a time point at which the terminal device completes CSI-RS receiving and a time point at which the terminal device completes processing on corresponding channel measurement feedback information. If the network device estimates that the terminal device is incapable of obtaining, before starting to process the first uplink data, a size of the channel measurement feedback information to be transmitted in the slot n, the network device may configure the first uplink data and the first channel measurement feedback information to be separately transmitted in the slot n, and the network device allocates the first time-frequency resource for transmission of the first uplink data, and allocates a second time-frequency resource for first channel measurement feedback information. The first time-frequency resource and the second time-frequency resource are independent of each other in time. In this way, a multiplexing resource does not need to be reserved for the first uplink control information when the first uplink data of the terminal device is transmitted. Therefore, a time period for waiting for completion of transmission of the channel measurement feedback information is not required before the first uplink data of the terminal device is transmitted, so that processing on the first uplink data of the terminal device is not affected by a time period for processing the to-be-multiplexed first channel measurement feedback information. This can quickly process the first uplink data.

It should be noted that, that the first time-frequency resource carries the first uplink data may be that the terminal device sends the first uplink data on the first time-frequency resource, or may be that the network device receives the first uplink data on the first time-frequency resource. Similarly, the terminal device may send the first uplink control information on the first time-frequency resource, or the network device may receive the first uplink control information on the first time-frequency resource. Alternatively, the terminal device sends the first uplink data and the first uplink control information on the first time-frequency resource, or the network device receives the first uplink data and the first uplink control information on the first time-frequency resource.

Optionally, the network device may further determine a transmission mode of the first uplink data and the first uplink control information based on the capability information, and then determine the first time-frequency resource based on the capability information and the transmission mode. In this way, the network device can further accurately determine a time-frequency resource for signal transmission, reduce a signal transmission delay, and avoid a scheduling failure. The transmission mode may be that the first uplink data and the first uplink control information are separately transmitted, or that the first uplink data and the first uplink control information are transmitted after being multiplexed.

In this embodiment of this application, that the first uplink data and the first control information are transmitted after being multiplexed may be: The network device allocates the first time-frequency resource to the terminal device to carry the first uplink data, and the terminal device reserves, in a rate matching manner or a puncturing manner, some of resource elements (resource element, RE) included in the allocated first time-frequency resource, to transmit the first uplink control information.

Optionally, in this embodiment of this application, that the first uplink data and the first control information are transmitted after being multiplexed may be a configuration that the terminal device simultaneously transmits the first uplink data and the first control information.

In this embodiment of this application, that the first uplink data and the first uplink control information are separately transmitted may be: The network device separately determines the first time-frequency resource and the second time-frequency resource. The first time-frequency resource is used to carry the first uplink data, and the second time-frequency resource is used to carry the first uplink control information. The first uplink data and the first uplink control information are not multiplexed, and transmission of the first uplink data is not limited by transmission of the first uplink control information.

When more than one type of uplink control information is scheduled, different transmission modes may be used for the uplink data and different types of uplink control information. For example, in the slot n, transmission of the first uplink data is scheduled, transmission of a first uplink ACK/NACK signal is scheduled, and transmission of the channel measurement feedback information is scheduled. In this case, the network device may determine that the first uplink data and the channel measurement feedback information are multiplexed and transmitted, and the first uplink data and the channel measurement feedback information that are multiplexed and the first uplink ACK/NACK signal are separately transmitted. That is, the network device determines the first time-frequency resource, to carry the first uplink data and the first channel measurement feedback information that are multiplexed. The network device determines the second time-frequency resource, to carry the first uplink ACK/NACK signal.

Optionally, that the network device determines a transmission mode of the first uplink data and the first uplink control information based on the capability information is specifically implemented in the following several implementations.

Manner 1:

The network device determines that a separate transmission mode is used for the first uplink data and the first uplink control information.

This manner means that the network device does not configure the first uplink data and the first uplink control information to be transmitted in a multiplexing manner. In the following embodiment, this transmission mode may also be referred to as a "separate uplink scheduling mode".

Further, the network device may configure the terminal device to work in the separate uplink scheduling mode, or configure the terminal device not to work in the separate uplink scheduling mode. When the terminal device works in the separate uplink scheduling mode, the network device does not configure the first uplink data and the first uplink control information to be transmitted in a multiplexing manner. The first uplink data and the first uplink control information are separately transmitted, and are not multiplexed. When the terminal device does not work in the separate uplink scheduling mode, the network device may configure, depending on a case, the first uplink data and the first uplink control information to be multiplexed and transmitted.

Manner 2:

The network device obtains the processing time period for the uplink data of the terminal device and the processing time period for the uplink control information of the terminal device. If the network device estimates that the terminal device can obtain the first uplink control information before starting to process the first uplink data, the network device determines that a multiplexing transmission mode is used for the first uplink data and the first uplink control information, otherwise, the network device determines that a separate transmission mode is used for the first uplink data and the first uplink control information.

The network device obtains a processing time period N2 for uplink data of the terminal device. If the capability information of the terminal device includes more than one uplink data processing time period, the network device obtains an uplink data processing time period that is closest to the to-be-scheduled first uplink data. For example, when the terminal device has different uplink processing time periods specific to different subcarrier spacings, the network device may use, as N2, an obtained uplink processing time period that uses a same subcarrier spacing as the to-be-scheduled first uplink data. For another example, when the terminal device has different uplink processing time periods specific to different transmission rates, the network device may use, as N2, an obtained uplink processing time period that is closest to the to-be-scheduled first uplink data and that is greater than or equal to a transmission rate of the first uplink data.

The network device obtains a processing time period K1 for the uplink control information of the terminal device. If the capability information of the terminal device includes more than one processing time period for the uplink control information, the network device may use, as K1, an obtained processing time period that is the same as or similar to a type of the to-be-scheduled first uplink control information and that is the most similar to the uplink control information.

For example, that the types are the same or similar may be that when the first uplink control information is channel measurement feedback information, a processing time period for channel measurement feedback information is selected. The closest may be that when the terminal device has different processing time periods for channel measurement feedback information that are specific to different subcarrier spacings, the network device obtains a processing time period that is for uplink control information and that uses a same subcarrier spacing as the to-be-scheduled first uplink control information.

Manner 3:

The network device obtains the processing time period for the uplink data of the terminal device. An obtaining manner is described above, and details are not described again.

The network device obtains the processing time period for the uplink control information of the terminal device. An obtaining manner is described above, and details are not described again.

The network device estimates that the terminal device can obtain a size of the first uplink control information before starting to process the first uplink data. In this case, the network device determines that a multiplexing transmission mode is used for the first uplink data and the first uplink control information, otherwise, the network device determines that a separate transmission mode is used for the first uplink data and the first uplink control information.

Manner 4:

The network device obtains a processing time period N2 for uplink data of the terminal device. An obtaining manner is described above, and details are not described again.

The network device obtains a processing time period K1 for uplink channel feedback information of the terminal device. The processing time period for the uplink channel feedback includes a time period for measuring an RI by the terminal device and a time period for measuring a PMI by the terminal device. Other obtaining manners are described above, and details are not described again.

The network device estimates that the terminal device can obtain a size of the first uplink channel feedback information before starting to process the first uplink data (for example, the size is estimated by using a time period for measuring an RI by the terminal). In this case, the network device determines that a multiplexing transmission mode is used for the first uplink data and the first uplink control information, otherwise, the network device determines that a separate transmission mode is used for the first uplink data and the first uplink control information.

Manner 5:

The network device obtains a processing time period N2 for uplink data of the terminal device. An obtaining manner is described above, and details are not described again.

The network device obtains a processing time period K1 for uplink channel feedback information of the terminal device. An obtaining manner is described above, and details are not described again.

The network device estimates that the terminal device can obtain the first uplink channel feedback information before starting to process the first uplink data. In this case, the network device determines that a multiplexing transmission mode is used for the first uplink data and the first uplink control information, otherwise, the network device determines that a separate transmission mode is used for the first uplink data and the first uplink control information.

Manner 6:

The network device obtains a processing time period N2 for uplink data of the terminal device. An obtaining manner is described above, and details are not described again.

The network device obtains a processing time period K1 for uplink control information of the terminal device. An obtaining manner is described above, and details are not described again.

The network device notifies the terminal device of a size of the first control channel information.

When determining that the terminal device can obtain the size of the first uplink control information before starting to process the first uplink data, the network device determines that a multiplexing transmission mode is used for the first uplink data and the first uplink control information.

Manner 7:

The network device obtains a processing time period N2 for uplink data of the terminal device. An obtaining manner is described above, and details are not described again.

The network device obtains a processing time period K1 for uplink control information of the terminal device. An obtaining manner is described above, and details are not described again.

The network device determines that a multiplexing transmission mode is used for the first uplink data and the first uplink control information, and the network device determines that the terminal device is to determine, according to a pre-agreed rule, a size of a resource, reserved for the first uplink control channel information, in the first time-frequency resource.

When determining that the terminal device can obtain a size of the first uplink control information before starting to process the first uplink data, the network device determines that a multiplexing transmission mode is used for the first uplink data and the first uplink control information.

For different configuration parameters, the agreed rule may specify that sizes of resources reserved for the first uplink control channel information are different. For example, for uplink ACK/NACK and uplink channel measurement feedback information, the sizes of the reserved resources are different. Different resources are reserved for different bandwidths. For different types of channel measurement feedback information, the sizes of the reserved resources are different. For different terminal antenna capabilities, the reserved resources are different.

In the method in this application, the starting, by the terminal device, to process the first uplink data specifically includes the following several cases:

A time point at which the terminal device detects scheduling information carrying the first uplink data is a time point at which the terminal device starts to process the first uplink data.

Alternatively, a time point at which the terminal device starts to calculate a rate matching parameter of the first uplink data is a time point at which the terminal device starts to process the first uplink data.

Alternatively, a time point at which the terminal device starts rate matching on the first uplink data is a time point at which the terminal device starts to process the first uplink data.

It should be understood that the signal in this embodiment of this application may include an uplink signal or uplink control information of the terminal device, for example, channel measurement feedback information; and may further include other information. This is not limited in this application.

When the first uplink control information is channel measurement feedback information, the following implementation method may be further used:

Optionally, the network device may determine, based on the processing time period for the uplink data of the terminal device and a processing time period for the channel measurement feedback information of the terminal device, whether the terminal device is capable of obtaining a size of the first channel measurement feedback information before starting to process the first uplink data. When determining that the terminal device is capable of obtaining the size of the channel measurement feedback information before starting to process the first uplink data, the network device determines that a transmission mode of the first uplink data and the channel measurement feedback information is that the first uplink data and the channel measurement feedback information are transmitted after being multiplexed.

Optionally, when determining that the terminal device is incapable of obtaining the size of the first channel measurement feedback information before starting to process the first uplink data, the network device determines that a transmission mode of the first uplink data and the first channel measurement feedback information is that the first uplink data and the first channel measurement feedback information are separately transmitted.

Optionally, before the terminal device starts to process the first uplink data may be further before the terminal device may further start rate matching parameter calculation or a puncturing parameter on the first uplink data.

Optionally, the network device may further determine, based on the processing time period for the uplink data of the terminal device and a processing time period for the channel measurement feedback information of the terminal device, whether the terminal device is capable of completing processing on the channel measurement feedback information before starting to process the first uplink data; determine whether the terminal device is capable of completing processing on the channel measurement feedback information before a first uplink data rate matching parameter is calculated or punctured; or determine whether the terminal device is capable of obtaining a size of the channel measurement feedback information before starting to process the first uplink data.

Optionally, the terminal device may specifically obtain the size of the measurement feedback information in several implementations:

Manner 1: The terminal device and the network device pre-agree on the size of the measurement feedback information in various cases according to a predefined rule.

Manner 2: The size of the measurement feedback information is set to a fixed value.

Manner 3: The network device notifies, by using signaling, the terminal of the size of the channel measurement feedback information.

Manner 4: The terminal device obtains the size of the channel measurement feedback information after measuring a CSI-RS. For example, the terminal device may obtain the size of the channel measurement feedback information after obtaining an RI of a channel by measuring the CSI-RS; or the terminal device may obtain the size of the channel measurement feedback information after obtaining a to-be-reported data packet by measuring the CSI-RS.

Manner 5: The terminal device may alternatively determine a size of previously measured channel measurement feedback information of the terminal device as a current size of channel measurement feedback information.

Optionally, the terminal device may alternatively determine the previously measured channel measurement feedback information of the terminal device as current channel measurement feedback information. In this case, the terminal device may consider only the processing time period for the uplink data, and may process the first uplink data based on the previous size of the channel measurement feedback information when learning the processing time period for the uplink data.

Correspondingly, the network device obtains the manner in which the terminal device obtains the size of the measurement feedback information, and estimates, in this manner, whether the terminal device can obtain the size of the first channel measurement feedback information before processing the first uplink data.

Optionally, through scheduling or configuration, the network device may use, during multiplexing transmission, channel measurement feedback information that has been recently measured before uplink data processing, instead of channel measurement feedback information specific to a CSI-RS in a current slot.

Figure 10:
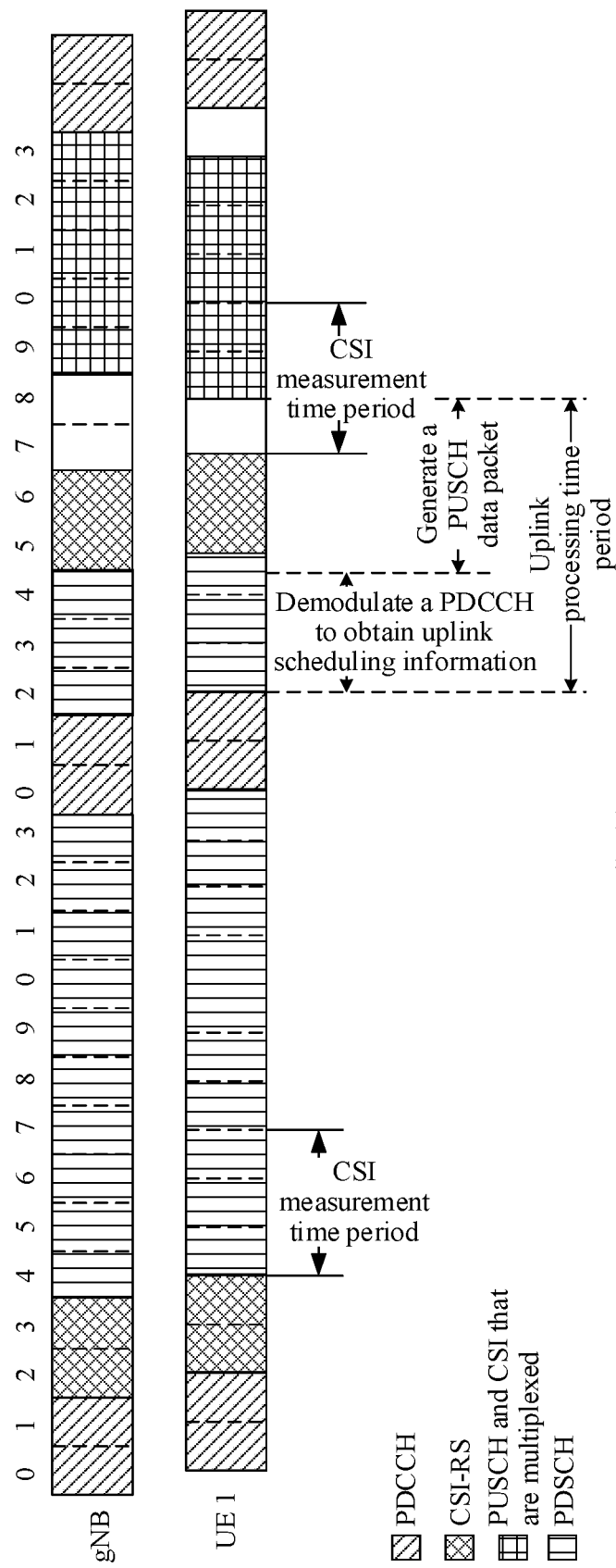
FIG. 10 is a schematic diagram of a signal processing method according to another embodiment of this application.

For example, as shown in FIG. 10, the network device schedules or configures the terminal device to multiplex, in the current slot, channel measurement feedback information specific to the CSI-RS in a previous slot with uplink data in the current slot, and transmit the channel measurement feedback information and the uplink data in the current slot, so that a delay caused because a time period for processing the first uplink control information specific to the CSI-RS in the current slot needs to be waited before the current uplink data is transmitted can be avoided.

The network device determines the first time-frequency resource after determining the transmission mode of the first uplink data and the first uplink control information.

Optionally, when the network device determines that the transmission mode of the first uplink data and the first uplink control information is that the first uplink data and the first uplink control information are transmitted after being multiplexed, the first time-frequency resource is used to carry the first uplink data and the first channel measurement feedback information that are multiplexed.

Optionally, when the network device determines that the transmission mode of the first uplink data and the first uplink control information is that the first uplink data and the first uplink control information are transmitted after being multiplexed, the network device determines the first time-frequency resource based on the capability information. The first time-frequency resource is used to carry the first uplink data. Further, the network device determines a second time-frequency resource based on the capability information. The second time-frequency resource is used to carry the first uplink control information, and the first time-frequency resource is the same as the second time-frequency resource.

Optionally, when the network device determines that the transmission mode of the first uplink data and the first uplink control information is that the first uplink data and the first uplink control information are transmitted after being multiplexed, the network device determines the first time-frequency resource based on the capability information. The first time-frequency resource is used to carry the first uplink control information. Further, the network device determines a second time-frequency resource based on the capability information. The second time-frequency resource is used to carry the first uplink data, and the first time-frequency resource is the same as the second time-frequency resource.

When the network device determines that the transmission mode of the first uplink data and the first uplink control information is that the first uplink data and the first uplink control information are transmitted after being multiplexed, the network device further determines a second time-frequency resource in addition to determining the first time-frequency resource. This is applicable to a scenario in which the network device respectively determines time-frequency resources for the first uplink data and the first uplink control information, instead of determining a shared time-frequency resource.

Optionally, when the network device determines that the first uplink data and the first uplink control information are separately transmitted, the first time-frequency resource is used to carry the first uplink data or the first uplink control information.

Optionally, when the transmission mode is that the first uplink data and the first uplink control information are separately transmitted, the network device determines the first time-frequency resource based on the capability information. The first time-frequency resource is used to carry the first uplink data. Further, the network device determines a second time-frequency resource based on the capability information. The second time-frequency resource is used to carry the first uplink control information.

Optionally, when the transmission mode is that the first uplink data and the first uplink control information are separately transmitted, the network device determines the first time-frequency resource based on the capability information. The first time-frequency resource is used to carry the first uplink control information. Further, the network device determines a second time-frequency resource based on the capability information. The second time-frequency resource is used to carry the first uplink data.

703: The network device sends first signaling to the terminal device, where the first signaling indicates the first time-frequency resource. Correspondingly, the terminal device receives the first signaling.

Optionally, when the network device determines that the transmission mode of the first uplink data and the first uplink control information is that the first uplink data and the first uplink control information are transmitted after being multiplexed, the network device may send the first signaling to the terminal device. The first signaling indicates the first time-frequency resource, and the first time-frequency resource is used to carry the first uplink data and the first uplink control information that are multiplexed.

Further, the first signaling further indicates that the first time-frequency resource is used to carry the first uplink data and the first uplink control information that are multiplexed. To be specific, the network device notifies the terminal device of the first time-frequency resource information, and further notifies the terminal device of information about multiplexing transmission of the first uplink data and the first uplink control information on the first time-frequency resource. Optionally, the network device may further instruct, by using other signaling, the first uplink data and the first uplink control information to be multiplexed and transmitted.

Optionally, the network device may alternatively indicate time-frequency resources respectively used to carry the first uplink data and the first uplink control information. Specifically, the network device sends the first signaling and second signaling to the terminal device. The first signaling indicates the first time-frequency resource, the first time-frequency resource is used to carry the first uplink data, the second signaling indicates a second time-frequency resource, and the second time-frequency resource is used to carry the first uplink control information. In addition, the second time-frequency resource is the same as the first time-frequency resource. After the terminal device receives the first signaling and the second signaling, if the terminal device determines that the second time-frequency resource is the same as the first time-frequency resource, it is considered that the first uplink data and the first uplink control information are transmitted after being multiplexed.

Optionally, the network device may indicate the first time-frequency resource by using the first signaling. According to an agreed rule, the first time-frequency resource is used to multiplex and transmit the first uplink data and the first uplink control information. The agreed rule is: According to an agreed time sequence relationship, for example, an agreed slot relationship, when channel measurement feedback information that is specific to a CSI-RS and that is sent in a slot n is transmitted in a slot (n+Y), and uplink data transmission in a slot (m+K2) is scheduled by using uplink scheduling signaling sent in a slot m, if the slot (n+Y) is the same as the slot (m+K2), it is agreed that the first time-frequency resource is used to carry a signal obtained after the uplink data transmitted in the slot and the uplink control information transmitted in the slot are multiplexed.

Alternatively, the network device sends the first signaling and second signaling to the terminal device. The first signaling indicates the first time-frequency resource, the first time-frequency resource is used to carry the first uplink control information, the second signaling indicates a second time-frequency resource, and the second time-frequency resource is used to carry the first uplink data. In addition, the second time-frequency resource is the same as the first time-frequency resource. When the first uplink data and the first uplink control signaling are multiplexed, preferably, the network device instructs, by using one type of signaling, the first uplink data and the first uplink control signaling to be multiplexed. Alternatively, as described above, the network device may instruct, by using two types of signaling, the terminal device to multiplex the first uplink data and the first uplink control signaling are multiplexed. A time-frequency resource carrying uplink data is usually notified to the terminal device by using an uplink scheduling command carried on a PDCCH, while a time-frequency resource carrying uplink control signaling may be determined by using higher layer signaling or according to a predefined rule. Therefore, the network device notifies the terminal device of the first time-frequency resource and the second time-frequency resource by using two types of signaling, where the first time-frequency resource is the same as the second time-frequency resource. After the terminal device receives the first signaling and the second signaling, if the terminal device determines that the second time-frequency resource is the same as the first time-frequency resource, it is considered that the first uplink data and the first uplink control information are transmitted after being multiplexed.

Optionally, when the transmission mode is that the first uplink data and the first uplink control information are separately transmitted, the network device sends the first signaling and second signaling to the terminal device. The first signaling indicates the first time-frequency resource, the first time-frequency resource is used to carry the first uplink data, the second signaling indicates a second time-frequency resource, and the second time-frequency resource is used to carry the first uplink control information. In addition, the second time-frequency resource is different from the first time-frequency resource.

Optionally, when the transmission mode is that the first uplink data and the first uplink control information are separately transmitted, the network device sends the first signaling and second signaling to the terminal device. The first signaling indicates the first time-frequency resource, the first time-frequency resource is used to carry the first uplink control information, the second signaling indicates a second time-frequency resource, and the second time-frequency resource is used to carry the first uplink data. In addition, the second time-frequency resource is different from the first time-frequency resource.

When the network device sends the second signaling, the terminal device correspondingly receives the second signaling.

The first signaling and/or the second signaling may be higher layer signaling, physical layer signaling, MAC layer signaling, some rules agreed in implementation, or a combination of at least two of higher layer signaling, physical layer signaling, MAC layer signaling, and an agreed rule. This application is not limited thereto.

704: The terminal device obtains the first time-frequency resource based on the first signaling, where the first time-frequency resource is used to carry the first uplink data and/or the first uplink control information.

The network device sends, to the terminal device, the time-frequency resource used to carry the first uplink data and/or the first uplink control information. In this case, the terminal device may determine the time-frequency resource used to carry the first uplink data and/or the uplink control information, and may further transmit first data and/or uplink control information on the first time-frequency resource, so that the network device can accurately receive the first uplink data and/or the first uplink control information within a relatively low delay.

Optionally, when the first time-frequency resource indicated by the first signaling is used to carry the first uplink data and the first uplink control information, the terminal device determines that the transmission mode of the first uplink data and the first uplink control information is that the first uplink data and the first uplink control information are transmitted after being multiplexed.

Optionally, when the first time-frequency resource indicated by the first signaling is used to carry the first uplink data or the first uplink control information, the terminal device may further receive second signaling, and the terminal device may determine a transmission mode of the first uplink data and the first uplink control information based on the first signaling and the second signaling. The transmission mode may be that the first uplink data and the first uplink information are separately transmitted, or that the first uplink data and the first uplink information are transmitted after being multiplexed. In this way, the terminal device can determine a manner for processing uplink data and uplink information.

Optionally, the terminal device may determine the transmission mode of the first uplink data and the first uplink control information depending on whether the first time-frequency resource indicated by the first signaling is the same as the second time-frequency resource indicated by the second signaling.

Specifically, if the first time-frequency resource indicated by the first signaling is the same as the second time-frequency resource indicated by the second signaling, the terminal device determines that the transmission mode of the first uplink data and the first uplink control information is that the first uplink data and the first uplink control information are transmitted after being multiplexed. If the first time-frequency resource indicated by the first signaling is different from the second time-frequency resource indicated by the second signaling, the terminal device may determine that the transmission mode of the first uplink data and the first uplink control information is that the first uplink data and the first uplink control information are separately transmitted. That is, the terminal device may determine the transmission mode of the first uplink data and the first uplink control information based on the first time-frequency resource indicated by the first signaling and the second time-frequency resource indicated by the second signaling.

Optionally, that the first time-frequency resource indicated by the first signaling is different from the second time-frequency resource indicated by the second signaling may be that a time-domain resource of the first time-frequency resource indicated by the first signaling is different from a time-domain resource of the second time-frequency resource indicated by the second signaling, may be that a frequency-domain resource of the first time-frequency resource indicated by the first signaling is different from a frequency-domain resource of the second time-frequency resource indicated by the second signaling; or may be that a time-domain resource and a frequency-domain resource of the time-frequency resource indicated by the first signaling may be different from a time-domain resource and a frequency-domain resource of the time-frequency resource indicated by the second signaling. This is not limited in this application.

It should be noted that when the first time-frequency resource indicated by the first signaling is different from the second time-frequency resource indicated by the second signaling, the frequency domain resource of the first time-frequency resource indicated by the first signaling may be the same as or different from the frequency domain resource of the second time-frequency resource indicated by the second signaling. When the frequency-domain resource of the first time-frequency resource indicated by the first signaling is different from the frequency-domain resource of the second time-frequency resource indicated by the second signaling, the time-domain resource of the first time-frequency resource indicated by the first signaling may be the same as or different from the time-domain resource of the second time-frequency resource indicated by the second signaling. This is not limited in this application.

Optionally, the first time-frequency resource indicated by the first signaling and the second time-frequency resource indicated by the second signaling are different in time domain, and may be further different slots or different symbols in a same slot.

Optionally, a slot in which the first time-frequency resource indicated by the first signaling is located and a slot in which the second time-frequency resource indicated by the second signaling is located may be adjacent slots. In this way, a low delay can be implemented as much as possible.

For example, the slot in which the time-frequency resource indicated by the first signaling is located is a slot 1, and the slot in which the time-frequency resource indicated by the second signaling is located is a slot 2 next to the slot 1. Alternatively, the slot in which the time-frequency resource indicated by the second signaling is located is a slot 1, and the slot in which the time-frequency resource indicated by the first signaling is located is a slot 2 next to the slot 1.

Optionally, when determining that the transmission mode of the first uplink data and the first uplink control information is that the first uplink data and the first uplink control information are transmitted after being multiplexed, the terminal device transmits, on the time-frequency resource indicated by the first signaling, the first uplink data and the channel measurement feedback information that are multiplexed.

Optionally, when determining that the transmission mode of the first uplink data and the first uplink control information is that the first uplink data and the first uplink control information are transmitted after being multiplexed, the terminal device may further determine, based on the processing time period for the uplink data of the terminal device and the processing time period for the uplink control information of the terminal device, whether to obtain a size of the first uplink control information before starting to process the first uplink data. If the terminal device can obtain the size of the first uplink control information before starting to process the first uplink data, the terminal device determines to send, on the first time-frequency resource, the first uplink data and the first uplink control information that are multiplexed.

Correspondingly, when determining that the transmission mode of the first uplink data and the first uplink control information is that the first uplink data and the first uplink control information are transmitted after being multiplexed, the network device receives, on the first time-frequency resource, the first uplink data and the first uplink control information that are multiplexed.

Optionally, when determining that the transmission mode of the first uplink data and the first uplink control information is that the first uplink data and the first uplink control information are transmitted after being multiplexed, the terminal device may further determine, based on the processing time period for the uplink data of the terminal device and the processing time period for the uplink control information of the terminal device, whether to obtain a size of the first uplink control information before starting to process the first uplink data. If the terminal device is incapable of obtaining the size of the first uplink control information before starting to process the first uplink data, the terminal device sends the first uplink data or the first channel measurement feedback information on the first time-frequency resource.

Correspondingly, when the network device determines that the transmission mode of the first uplink data and the first uplink control information is that the first uplink data and the first uplink control information are transmitted after being multiplexed, the first uplink data and the first uplink control information may alternatively be received on the first time-frequency resource, or the first uplink data or the first uplink control information may be received on the first time-frequency resource. In this case, when determining that the transmission mode of the first uplink data and the first uplink control information is that the first uplink data and the first uplink control information are transmitted after being multiplexed, the network device first attempts to receive the first uplink data and the first uplink control information that are multiplexed. If the first uplink data and the first uplink control information that are multiplexed cannot be successfully received, the network device further needs to separately attempt to receive the first uplink data and the first uplink control information.

Optionally, when determining that the transmission mode in which the network device sends the first uplink data and the first uplink control information is that the first uplink data and the first uplink control information are transmitted after being multiplexed, if determining to send the first uplink data or the first uplink control information on the first time-frequency resource, the terminal device may further send notification information to the network device. The notification information indicates that the terminal device sends only one type of signal on the first time-frequency resource. In this way, the network device may learn, based on the notification information, that one type of information is received on the first time-frequency resource, and does not need to distinguish between the first uplink data and the channel measurement feedback information. This reduces a signal processing time period.

For example, the terminal device sends only the first uplink data or the first uplink control information on the first time-frequency resource.

Optionally, if neither processing on the first uplink data nor processing on the first uplink control information is processed when the first time-frequency resource arrives, or if the terminal device determines, based on the capability information of the terminal device, that neither processing on the first uplink data nor processing on the first uplink control information is completed when the first time-frequency resource arrives, the terminal device neither sends the first uplink data nor sends the first uplink control information; or if the terminal device determines, based on the capability information of the terminal device, that processing on the first uplink data cannot be completed when the first time-frequency resource arrives; or if the terminal device determines, based on the capability information of the terminal device, that processing on the first uplink control information cannot be completed when the first time-frequency resource arrives. In this case, the terminal device may send indication information to the network device, to notify the network device of the error status. In this way, the network device can correctly re-schedule the terminal device.

Optionally, the terminal device may further pre-agree with the network device on a size of uplink control information multiplexed with the first data or the terminal device sets a size of uplink control information multiplexed with the first data, or the network device may notify the terminal device of a size of to-be-multiplexed first uplink control information. In this way, the terminal device may process the first uplink data based on a fixed or known size of the uplink control information when the first uplink data and the first uplink control channel information are multiplexed.

Optionally, after step 704, this application may further include: sending, by the terminal device, the first uplink data and/or the first uplink control information on the first time-frequency resource. Correspondingly, the network device receives the first uplink data, the first uplink control information, or the first uplink data and the first uplink control information on the first time-frequency resource.

When the network device determines that the transmission mode of the first uplink data and the first uplink control information is that the first uplink data and the first uplink control information are transmitted after being multiplexed, if the terminal device can send, on the first time-frequency resource, the first uplink data and the first uplink control information that are multiplexed, the terminal device sends, on the first time-frequency resource, the first uplink data and the first uplink control information that are multiplexed.

When the network device determines that the transmission mode of the first uplink data and the first uplink control information is that the first uplink data and the first uplink control information are transmitted after being multiplexed, if the terminal device is incapable of sending, on the first time-frequency resource, the first uplink data and the first uplink control information that are multiplexed, the terminal device may further send the first uplink data or the first uplink control information on the first time-frequency resource. This avoids a waste of resources and improves resource utilization.

Correspondingly, when the network device determines that the transmission mode of the first uplink data and the first uplink control information is that the first uplink data and the first uplink control information are transmitted after being multiplexed, if the network device fails to receive, on the first time-frequency resource, the first uplink data and the first uplink control information that are multiplexed, the network device may attempt, through blind detection, to receive the first uplink data or the first uplink control information sent by the terminal device. This can avoid a waste of resources and improve resource utilization.

Optionally, when calculating a power headroom (power headroom, PHR), the terminal device needs to obtain a size, corresponding to the PHR, of the transmitted first uplink data and a size of transmitted first uplink control information. Further, the terminal device may further determine, based on the capability information, a method for calculating an uplink power headroom.

Specifically, before reporting the PHR to the network device, the terminal device may generate the PHR based on the processing time period for the uplink data of the terminal device and the processing time period for the uplink control information of the terminal device. Specifically, the following several implementations may be used.

Manner 1: The PHR of the terminal device is calculated without considering the size of the uplink control information. Manner 2: If the terminal device cannot learn, during PHR calculation, the size of the first uplink control information multiplexed with the first uplink data for transmission, the terminal device may not multiplex the first uplink data and the first uplink control information. For example, the terminal device may generate the PHR based on only the first uplink data or based on a fixed size of the first uplink control information. If the terminal device can obtain, during PHR calculation, the size of the uplink control information multiplexed with the first uplink data for transmission, the terminal device may calculate the PHR based on the size of the first uplink data and the size of the first uplink control information.

Manner 3: The terminal device may self-determine whether the size of the first uplink control information is considered during PHR calculation. In addition, the terminal device further sends indication information to the network device, and indicates, by using the indication information, whether the size of the first uplink control information is considered when the PHR is generated by the terminal device.

Manner 4: The terminal device may pre-agree with the network device on the size, used during PHR calculation, of the first uplink control information. In this case, if the terminal device determines that the transmission mode of the first uplink data and the first channel measurement feedback information is that the first uplink data and the first channel measurement feedback information are transmitted after being multiplexed, the terminal device may generate the PHR by using the agreed value.

Manner 5: If the network device notifies the terminal device of the size, used during PHR calculation, of the first uplink control information, the terminal device receives the information, and uses the size of the first uplink control information during PHR calculation.

Therefore, according to the signal processing method in this embodiment of this application, the network device determines a PHR calculation manner based on the capability information that includes the processing time period for the uplink data of the terminal device and the processing time period for the uplink control information of the terminal device. This avoids an increase in a PHR calculation processing time period caused by the processing time period for the uplink control information.

It should be understood that the specific examples in this embodiment of this application are merely intended to help a person skilled in the art better understand this embodiment of this application, rather than limit the scope of this embodiment of this application.

It should be understood that sequence numbers of the foregoing processes do not mean execution sequences in the embodiments of this application. The execution sequences of the processes should be determined based on functions and internal logic of the processes, and should not be construed as any limitation on the implementation processes of the embodiments of this application.

The foregoing describes in detail the signal processing method according to the embodiment of this application. The following describes signal processing apparatuses according to embodiments of this application.

Figure 11:
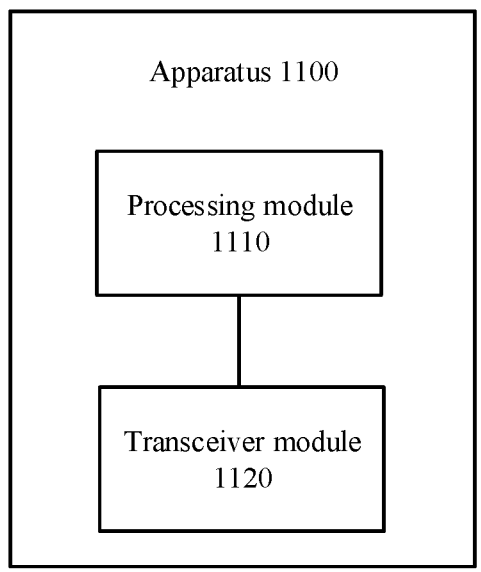
FIG. 11 is a schematic block diagram of a signal processing apparatus according to an embodiment of this application.

FIG. 11 shows a signal processing apparatus 1100 according to an embodiment of this application. As shown in FIG. 11, the apparatus 1100 may be a network device.

It should be understood that the apparatus 1100 may correspond to the network device in each method embodiment, and may have any function of the network device in the method. The apparatus 1100 includes a processing unit 1110 and a transceiver unit 1120.

The processing unit 1110 is configured to obtain capability information of a terminal device. The capability information includes a processing time period for uplink data of the terminal device and a processing time period for uplink control information of the terminal device.

Optionally, when the processing unit 1110 obtains the capability information sent by the terminal device, the processing unit 1110 may obtain the capability information by using the transceiver unit. When the processing unit 1110 obtains capability information sent by a core network device or another base station, the processing unit 1110 may obtain the capability information by using a communications interface between the processing unit 1110 and the core network device or the another base station. The processing unit 1110 may alternatively read stored capability information of the terminal device from a storage unit of the network device.

It should be further understood that a manner in which the apparatus 1100 obtains the capability information of the terminal device may be the same as that in the foregoing method embodiment. To avoid repetition, details are not described herein again. However, this application is not limited thereto.

The processing unit 1110 is further configured to determine a first time-frequency resource based on the capability information. The first time-frequency resource is used to carry first uplink data and/or first uplink control information.

The transceiver unit 1120 is configured to send first signaling to the terminal device. The first signaling indicates the first time-frequency resource. Optionally, the transceiver unit may be an input/output interface, a pin, a circuit, or the like, or may be implemented by a transceiver including a radio frequency circuit.

Therefore, the signal processing apparatus in this embodiment of this application determines, based on the capability information that includes the processing time period for the uplink data of the terminal device and the processing time period for the uplink control information of the terminal device, the first time-frequency resource used to carry the first uplink data and/or the first uplink control information; and sends the first signaling to the terminal device to indicate the first time-frequency resource. In this way, a relatively long transmission delay or a scheduling failure for the uplink data and/or the uplink control information is avoided, that is, efficiency of configuring a time-frequency resource by the network device is improved, and a signal transmission delay is reduced.

Optionally, the processing unit 1120 is further configured to determine a transmission mode of the first uplink data and the first uplink control information based on the capability information. The transmission mode is that the first uplink data and the first uplink control information are separately transmitted, or that the first uplink data and the first uplink control information are transmitted after being multiplexed.

The processing unit 1110 is specifically configured to:

determine the first time-frequency resource based on the capability information and the transmission mode.

Optionally, the processing unit 1110 is specifically configured to:

determine, based on the processing time period for the uplink data of the terminal device and the processing time period for the uplink control information of the terminal device, whether the terminal device is capable of obtaining a size of the first uplink control information of the terminal device before starting to process the first uplink data; and when determining that the terminal device is capable of obtaining the size of the first uplink control information before starting to process the first uplink data, determine that the transmission mode is that the first uplink data and the first uplink control information are transmitted after being multiplexed; or when determining that the terminal device is incapable of obtaining the size of the first uplink control information before starting to process the first uplink data, determine that the transmission mode is that the first uplink data and the first uplink control information are separately transmitted.

Optionally, the processing unit 1110 is specifically configured to:

when the transmission mode is that the first uplink data and the first uplink control information are transmitted after being multiplexed, determine the first time-frequency resource based on the capability information, where the first time-frequency resource is used to carry the first uplink data and the first uplink control information that are multiplexed.

Optionally, the processing unit 1110 is specifically configured to:

when the transmission mode is that the first uplink data and the first uplink control information are transmitted after being multiplexed, determine the first time-frequency resource based on the capability information, where the first time-frequency resource is used to carry the first uplink data.

The processing unit 1110 is further configured to determine a second time-frequency resource. The second time-frequency resource is used to carry the first uplink control information, and the second time-frequency resource is the same as the first time-frequency resource.

The transceiver unit 1120 is further configured to send second signaling to the terminal device. The second signaling indicates the second time-frequency resource.

Optionally, the processing unit 1110 is specifically configured to:

when the transmission mode is that the first uplink data and the first uplink control information are transmitted after being multiplexed, determine the first time-frequency resource based on the capability information, where the first time-frequency resource is used to carry the first uplink control information.

The processing unit 1110 is further configured to determine a second time-frequency resource. The second time-frequency resource is used to carry the first uplink data, and the second time-frequency resource is the same as the first time-frequency resource.

The transceiver unit 1120 is further configured to send second signaling to the terminal device. The second signaling indicates the second time-frequency resource.

Optionally, the transceiver unit 1120 is further configured to:

receive, on the first time-frequency resource, the first uplink data and the first uplink control information that are multiplexed; or receive the first uplink data or the first uplink control information on the first time-frequency resource.

Optionally, the processing unit 1110 is specifically configured to:

when the transmission mode is that the first uplink data and the first uplink control information are separately transmitted, determine the first time-frequency resource based on the capability information, where the first time-frequency resource is used to carry the first uplink data.

The processing unit 1110 is further configured to: when the transmission mode is that the first uplink data and the first uplink control information are separately transmitted, determine the second time-frequency resource based on the capability information. The second time-frequency resource is used to carry the first uplink control information, and the second time-frequency resource is different from the first time-frequency resource.

The transceiver unit 1120 is further configured to send second signaling to the terminal device. The second signaling is used to indicate the second time-frequency resource.

Optionally, the processing unit 1110 is specifically configured to:

when the transmission mode is that the first uplink data and the first uplink control information are separately transmitted, determine the first time-frequency resource based on the capability information, where the first time-frequency resource is used to carry the first uplink control information.

The processing unit 1110 is further configured to: when the transmission mode is that the first uplink data and the first uplink control information are separately transmitted, determine the second time-frequency resource based on the capability information. The second time-frequency resource is used to carry the first uplink data, and the second time-frequency resource is different from the first time-frequency resource.

The transceiver unit 1120 is further configured to send second signaling to the terminal device. The second signaling is used to indicate the second time-frequency resource.

Optionally, that the second time-frequency resource is different from the first time-frequency resource is that the first time-frequency resource and the second time-frequency resource are in different symbols in a same slot, or that slots in which the first time-frequency resource and the second time-frequency resource are located are different, or that the first time-frequency resource and the second time-frequency resource are on different frequency domain resources in a same slot.

Optionally, that the first uplink data and the first uplink control information are multiplexed is that the first uplink data and the first uplink control information are multiplexed in a puncturing or rate matching manner.

Optionally, the first uplink control information includes at least one of a first uplink acknowledgment signal and first uplink channel measurement feedback information.

Therefore, the signal processing apparatus in this embodiment of this application determines, based on the capability information that includes the processing time period for the uplink data of the terminal device and the processing time period for the uplink control information of the terminal device, the first time-frequency resource used to carry the first uplink data and/or the first uplink control information; and sends the first signaling to the terminal device to indicate the first time-frequency resource. In this way, a relatively long transmission delay or a scheduling failure for the uplink data and/or the uplink control information is avoided, that is, efficiency of configuring a time-frequency resource by the network device is improved, and a signal transmission delay is reduced.

Optionally, the signal processing apparatus 1100 in this embodiment of this application may be a network device, or may be a chip in a network device.

It should be understood that the signal processing apparatus 1100 in this embodiment of this application may correspond to the network device in the signal processing method in the embodiment of FIG. 7, and the foregoing and other management operations and/or functions of the units of the signal processing apparatus 1100 are separately performed to implement the corresponding steps in the foregoing methods. For brevity, details are not described herein again.

Figure 12:
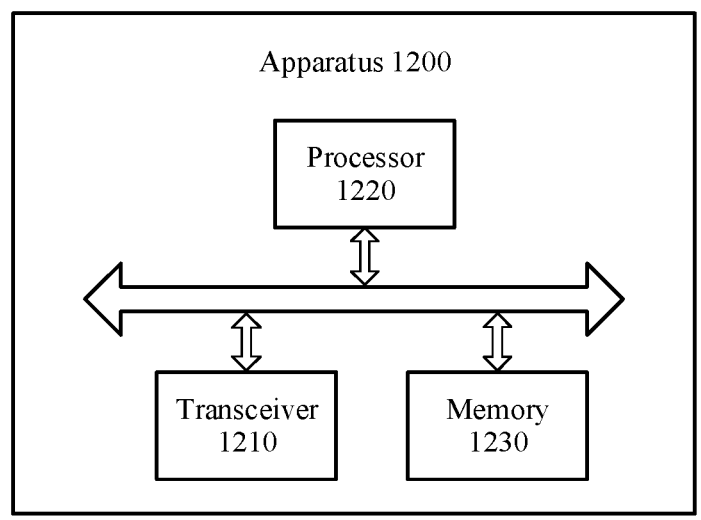
FIG. 12 is a schematic structural diagram of a signal processing apparatus according to another embodiment of this application.

Optionally, if the signal processing apparatus 1100 is a network device, the transceiver unit 1120 in this embodiment of this application may be implemented by a transceiver 1210, and the processing unit 1110 may be implemented by a processor 1220. As shown in FIG. 12, the signal processing apparatus 1200 may include the transceiver 1210, the processor 1220, and a memory 1230. The memory 1230 may be configured to store indication information, and may be further configured to store code, an instruction, and the like that are executed by the processor 1220. The transceiver 1210 may include a radio frequency circuit. Optionally, the network device alternatively includes a storage unit.

The storage unit may be, for example, a memory. When the network device includes a storage unit, the storage unit is configured to store a computer executable instruction. The processing unit is connected to the storage unit, and the processing unit executes the computer executable instruction stored in the storage unit, so that the network device performs the foregoing signal processing method.

Optionally, if the signal processing apparatus 1100 is a chip in a network device, the chip includes a processing unit 1110 and a transceiver unit 1120. The transceiver unit 1120 may be implemented by the transceiver 1210, and the processing unit 1110 may be implemented by the processor 1220. The transceiver unit may be, for example, an input/output interface, a pin, or a circuit. The processing unit may execute a computer executable instruction stored in a storage unit. Optionally, the storage unit is a storage unit in the chip, such as a register or a buffer; or the storage unit may be a storage unit located in the terminal but outside the chip, such as a read-only memory (read-only memory, ROM), another type of static storage device capable of storing static information and instructions, or a random access memory (random access memory, RAM).

Figure 13:
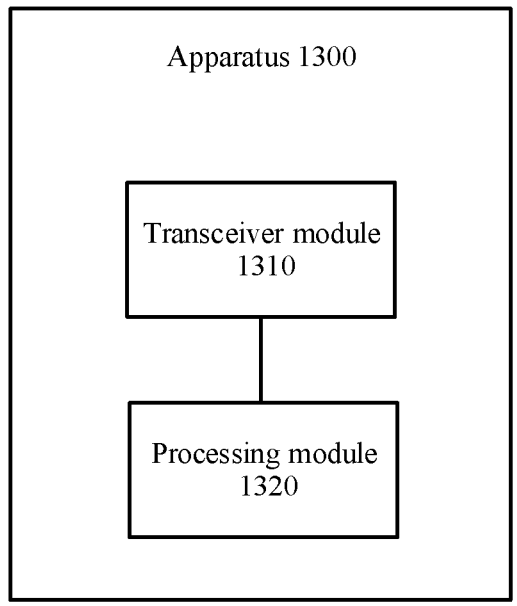
FIG. 13 is a schematic block diagram of a signal processing apparatus according to another embodiment of this application.

FIG. 13 is a schematic block diagram of a signal processing apparatus 1300 according to another embodiment of this application. As shown in FIG. 13, the apparatus 1300 may be a terminal device, and includes a transceiver unit 1310 and a processing unit 1320.

It should be understood that the apparatus 1300 may correspond to the terminal device in each method embodiment, and may have any function of the terminal device in the method.

The transceiver unit 1310 is configured to send capability information to a network device. The capability information includes a processing time period for processing uplink data by the terminal device and a processing time period for processing uplink control information by the terminal device.

The transceiver unit 1310 is further configured to receive first signaling. The first signaling indicates a first time-frequency resource, and the first time-frequency resource is used to carry first uplink data and/or first uplink control information.

The processing unit 1320 is configured to determine the first time-frequency resource based on the first signaling.

Therefore, the signal processing apparatus in this embodiment of this application sends, to the network device, the capability information that includes the uplink data and the uplink control information; receives the first signaling sent by the network device, where the first signaling indicates the first time-frequency resource used to carry the first uplink data and/or the first uplink control information, and the first time-frequency resource may be determined by the network device based on the capability information of the terminal device; and determines the first time-frequency resource based on the first signaling. In this way, a relatively long transmission delay or a scheduling failure for the uplink data and/or the uplink control information is avoided, that is, efficiency of configuring a time-frequency resource by the network device is improved, and a signal transmission delay is reduced.

Optionally, the first time-frequency resource is used to carry the first uplink data.

The transceiver unit 1310 is further configured to receive second signaling. The second signaling indicates a second time-frequency resource, and the second time-frequency resource is used to carry the first uplink control information.

The processing unit 1320 is further configured to determine a transmission mode of the first uplink data and the first uplink control information based on the first signaling and the second signaling. The transmission mode is that the first uplink data and the first uplink control information are separately transmitted, or that the first uplink data and the first uplink control information are transmitted after being multiplexed.

Optionally, the first time-frequency resource is used to carry the first uplink control information.

The transceiver unit 1310 is further configured to receive second signaling. The second signaling indicates a second time-frequency resource, and the second time-frequency resource is used to carry the first uplink data.

The processing unit 1320 is further configured to determine a transmission mode of the first uplink data and the first uplink control information based on the first signaling and the second signaling. The transmission mode is that the first uplink data and the first uplink control information are separately transmitted, or that the first uplink data and the first uplink control information are transmitted after being multiplexed.

Optionally, the processing unit 1320 is further configured to: when the first time-frequency resource is used to carry the first uplink data and the first uplink control information, determine that a transmission mode of the first uplink data and the first uplink control information is that the first uplink data and the first uplink control information are transmitted after being multiplexed.

Optionally, the processing unit 1320 is specifically configured to:

when the first time-frequency resource is the same as the second time-frequency resource, determine that the transmission mode is that the first uplink data and the first uplink control information are transmitted after being multiplexed; or when the first time-frequency resource is different from the second time-frequency resource, determine that the transmission mode is that the first uplink data and the first uplink control information are separately transmitted.

Optionally, when determining that the transmission mode is that the first uplink data and the first uplink control information are transmitted after being multiplexed, the processing unit 1320 is further configured to determine whether a size of the first uplink control information is obtained before the first uplink data starts to be processed.

The transceiver unit 1310 is further configured to: when the terminal device obtains the size of the first uplink control information before starting to process the first uplink data, send, on the first time-frequency resource, the first uplink data and the first uplink control information that are multiplexed.

Optionally, when determining that the transmission mode is that the first uplink data and the first uplink control information are transmitted after being multiplexed, the processing unit 1320 is further configured to determine whether a size of the first uplink control information is obtained before the first uplink data starts to be processed.

The transceiver unit 1310 is further configured to: when the terminal device does not obtain the size of the first uplink control information before starting to process the first uplink data, send the first uplink data or the first uplink control information on the first time-frequency resource.

Optionally, that the first time-frequency resource is different from the second time-frequency resource is that the first time-frequency resource and the second time-frequency resource are in different symbols in a same slot, or that slots in which the first time-frequency resource and the second time-frequency resource are located are different, or that the first time-frequency resource and the second time-frequency resource are on different frequency domain resources in a same slot.

Optionally, that the first uplink data and the first uplink control information are multiplexed is that the first uplink data and the first uplink control information are multiplexed in a puncturing or rate matching manner.

Optionally, the first uplink control information includes at least one of a first uplink acknowledgment signal and first uplink channel measurement information feedback information.

Therefore, the signal processing apparatus in this embodiment of this application sends, to the network device, the capability information that includes the uplink data and the uplink control information; receives the first signaling sent by the network device, where the first signaling indicates the first time-frequency resource used to carry the first uplink data and/or the first uplink control information, and the first time-frequency resource may be determined by the network device based on the capability information of the terminal device; and determines the first time-frequency resource based on the first signaling. In this way, a relatively long transmission delay or a scheduling failure for the uplink data and/or the uplink control information is avoided, that is, efficiency of configuring a time-frequency resource by the network device is improved, and a signal transmission delay is reduced.

Optionally, the signal processing apparatus 1300 in this embodiment of this application may be a terminal device, or may be a chip in a terminal device.

It should be understood that the signal processing apparatus 1300 in this embodiment of this application may correspond to the terminal device in the signal processing method in the embodiment of FIG. 7, and the foregoing and other management operations and/or functions of the units of the signal processing apparatus 1300 are separately performed to implement the corresponding steps in the foregoing methods. For brevity, details are not described herein again.

Figure 14:
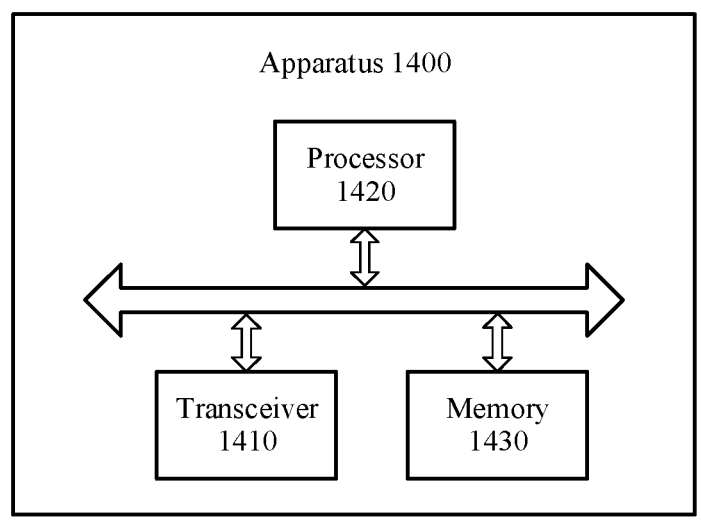
FIG. 14 is a schematic structural diagram of a signal processing apparatus according to another embodiment of this application.

Optionally, if the signal processing apparatus 1300 is a terminal device, the transceiver unit 1310 in this embodiment of this application may be implemented by a transceiver 1410, and the processing unit 1320 may be implemented by a processor 1420. As shown in FIG. 14, the apparatus 1400 may include the transceiver 1410, the processor 1420, and a memory 1430. The memory 1430 may be configured to store indication information, and may be further configured to store code, an instruction, and the like executed by the processor 1420. The transceiver may include a radio frequency circuit. Optionally, the terminal device alternatively includes a storage unit.

The storage unit may be, for example, a memory. When the network device includes a storage unit, the storage unit is configured to store a computer executable instruction. The processing unit is connected to the storage unit, and the processing unit executes the computer executable instruction stored in the storage unit, so that the network device performs the foregoing signal processing method.

Optionally, if the signal processing apparatus 1300 is a chip in a terminal device, the chip includes a processing unit 1320 and a transceiver unit 1310. The transceiver unit 1310 may be, for example, an input/output interface, a pin, or a circuit of the chip. The processing unit 1320 may execute a computer executable instruction stored in a storage unit.

Optionally, the storage unit is a storage unit in the chip, such as a register or a buffer; or the storage unit may be a storage unit located in the terminal but outside the chip, such as a read-only memory (read-only memory, ROM), another type of static storage device capable of storing static information and instructions, or a random access memory (random access memory, RAM). Optionally, the storage unit is a storage unit in the chip, such as a register or a buffer; or the storage unit may be a storage unit located in the terminal but outside the chip, such as a read-only memory (read-only memory, ROM), another type of static storage device capable of storing static information and instructions, or a random access memory (random access memory, RAM).

It should be understood that, the processor 1220 or the processor 1420 may be an integrated circuit chip, and has a signal processing capability. In an implementation process, the steps in the foregoing method embodiments may be implemented by using a hardware integrated logic circuit in the processor, or by using instructions in a form of software. The foregoing processor may be a general-purpose processor, a digital signal processor (digital signal processor, DSP), an application-specific integrated circuit (application specific integrated circuit, ASIC), a field programmable gate array (field programmable gate array, FPGA) or another programmable logic device, a discrete gate or transistor logic device, or a discrete hardware component; and may implement or perform the method, the steps, and logical block diagrams that are disclosed in the embodiments of this application. The general-purpose processor may be a microprocessor, or the processor may be any conventional processor or the like. The steps in the methods disclosed with reference to the embodiments of this application may be directly executed and accomplished by a hardware decoding processor, or may be executed and accomplished by using a combination of hardware and software modules in the decoding processor. A software module may be located in a storage medium mature in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It can be understood that the memory 1230 or the memory 1430 in this embodiment of this application may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchronous link DRAM, SLDRAM), and a direct rambus random access memory (direct rambus RAM, DR RAM). It should be noted that the memory in the systems and method described in this specification includes but is not limited to these memories and memories of any other proper types.

Figure 15:
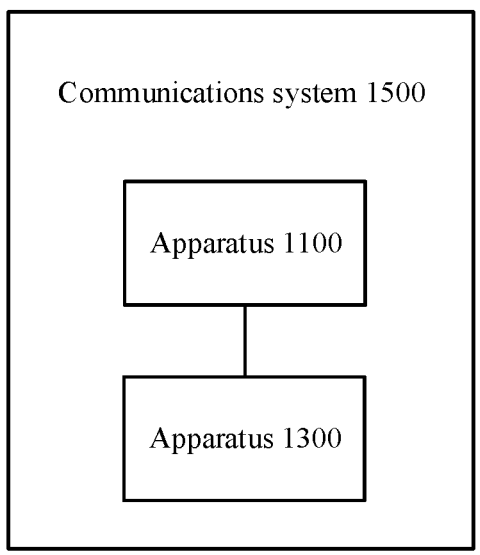
FIG. 15 is a schematic structural diagram of a communications system according to an embodiment of this application.

FIG. 15 shows a communications system 1500 according to an embodiment of this application. The communications system 1500 includes:

the signal processing apparatus 1100 in the embodiment shown in FIG. 11 and the signal processing apparatus 1300 in the embodiment shown in FIG. 13.

An embodiment of this application further provides a computer storage medium. The computer storage medium may store a program instruction for indicating any one of the foregoing methods.

Optionally, the storage medium may be specifically the memory 1230 or 1430.

An embodiment of this application further provides a chip system. The chip system includes a processor, configured to support a distributed unit, a centralized unit, and a terminal device in implementing the functions in the foregoing embodiments, for example, generating or processing the data and/or information in the foregoing method.

In a possible design, the chip system further includes a memory. The memory is configured to store a program instruction and data that are necessary for the distributed unit, the centralized unit, and the terminal device. The chip system may include a chip, or may include a chip and another discrete component.

A person of ordinary skill in the art may be aware that, units and algorithm steps in the examples described with reference to the embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a specific working process of the foregoing system, apparatus, and unit, refer to a corresponding process in the foregoing method embodiment, and details are not described herein again.

In the several embodiments provided in this application, it should be understood that the disclosed systems, apparatuses, and method may be implemented in other manners. For example, the described apparatus embodiments are merely examples. For example, division into the unit is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate components may or may not be physically separate, and components displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A signal processing method, comprising:
   obtaining capability information of a terminal device, wherein the capability information comprises a processing time period for uplink data of the terminal device and a processing time period for uplink control information of the terminal device;
   determining, based on the capability information, a transmission mode for transmitting the uplink data and the uplink control information from a first transmission mode or a second transmission mode, wherein the uplink data and the uplink control information are separately transmitted according to the first transmission mode, and wherein the uplink data and the uplink control information are transmitted after being multiplexed according to the second transmission mode;
   determining a time-frequency resource for transmitting the uplink data and the uplink control information based on the transmission mode; and
   sending first signaling to the terminal device, wherein the first signaling indicates the time-frequency resource.

2. The method according to claim 1, wherein the transmission mode is determined as the second transmission mode and the time-frequency resource carries the uplink data and the uplink control information that are multiplexed.

3. The method according to claim 1, wherein the transmission mode is determined as the second transmission mode and the time-frequency resource is a first time-frequency resource that carries the uplink data; and
   the method further comprises:
   determining a second time-frequency resource same as the first time-frequency resource, wherein the second time-frequency resource carries the uplink control information; and
   sending second signaling to the terminal device, wherein the second signaling indicates the second time-frequency resource.

4. A signal processing method, comprising:
   sending capability information to a network device, wherein the capability information comprises a processing time period for processing uplink data by a terminal device and a processing time period for processing uplink control information by the terminal device;
   determining, based on the capability information, a transmission mode for transmitting the uplink data and the uplink control information from a first transmission mode or a second transmission mode, wherein the uplink data and the uplink control information are separately transmitted according to the first transmission mode, and wherein the uplink data and the uplink control information are transmitted after being multiplexed according to the second transmission mode;
   receiving first signaling, wherein the first signaling indicates a time-frequency resource, and the time-frequency resource carries one or more of uplink data or uplink control information; and
   determining the time-frequency resource based on the first signaling and the transmission mode.

5. The method according to claim 4, wherein the time-frequency resource is a first time frequency resource that carries the uplink data; and
   the method further comprises:
   receiving second signaling, wherein the second signaling indicates a second time-frequency resource, and the second time-frequency resource carries the uplink control information.

6. The method according to claim 4, wherein the transmission mode is determined as the second transmission mode and the time-frequency resource carries the uplink data and the uplink control information that are multiplexed.

7. The method according to claim 5, wherein the transmission mode is determined as the second transmission mode when the time frequency resource is same as the second time-frequency resource; and
   the transmission mode is determined as the transmission mode when the time-frequency resource is different from the second time-frequency resource.

8. A signal processing apparatus, comprising:
   at least one processor;
   a memory coupled to the at least one processor and storing programming instructions for execution by the at least one processor, the programming instructions instruct the at least one processor to:
   obtain capability information of a terminal device, wherein the capability information comprises a processing time period for uplink data of the terminal device and a processing time period for uplink control information of the terminal device;
   determine, based on the capability information, a transmission mode for transmitting the uplink data and the uplink control information from a first transmission mode or a second transmission mode, wherein the uplink data and the uplink control information are separately transmitted according to the first transmission mode, and wherein the uplink data and the uplink control information are transmitted after being multiplexed according to the second transmission mode;

determine a time-frequency resource for transmitting the uplink data and the uplink control information based on the transmission mode; and cause a transmitter to send first signaling to the terminal device, wherein the first signaling indicates the time-frequency resource.

9. The apparatus according to claim 8, wherein the transmission mode is determined as the second transmission mode and the time-frequency resource carries the uplink data and the uplink control information that are multiplexed.

10. The apparatus according to claim 8, wherein the transmission mode is determined as the second transmission mode and the programming instructions further instruct the at least one processor to:

determine a second time-frequency resource same as the time-frequency resource, wherein the second time-frequency resource carries the uplink control information; and cause the transmitter to send second signaling to the terminal device, wherein the second signaling indicates the second time-frequency resource.

11. A signal processing apparatus, comprising:

at least one processor;

a non-transitory computer-readable storage medium coupled to the at least one processor and storing programming instructions for execution by the at least one processor, the programming instructions instruct the at least one processor to:

cause a transmitter to send capability information to a network device, wherein the capability information comprises a processing time period for processing uplink data by a terminal device and a processing time period for processing uplink control information by the terminal device;

determine, based on the capability information, a transmission mode for transmitting the uplink data and the uplink control information from a first transmission mode or a second transmission mode, wherein the uplink data and the uplink control information are separately transmitted according to the first transmission mode, and wherein the uplink data and the uplink control information are transmitted after being multiplexed according to the second transmission mode;

cause the transmitter to receive first signaling, wherein the first signaling indicates a time-frequency resource, and the time-frequency resource carries one or more of uplink data or uplink control information; and determine the time-frequency resource based on the first signaling and the transmission mode.

12. The apparatus according to claim 11, wherein the time-frequency resource is a first time frequency resource that carries the uplink data; and the programming instructions instruct the at least one processor to cause the transmitter is to receive second signaling, wherein the second signaling indicates a second time-frequency resource, and the second time-frequency resource carries the uplink control information.

13. The apparatus according to claim 11, wherein the transmission mode is determined as the second transmission mode and the time-frequency resource carries the uplink data and the uplink control information that are multiplexed.

14. The apparatus according to claim 12, wherein the transmission mode is determined as the second transmission mode when the first time frequency resource is same as the second time-frequency resource; and the transmission mode is determined as the first transmission mode when the time-frequency resource is different from the second time-frequency resource.

15. The method according to claim 1, wherein the uplink control information comprises uplink acknowledgement signal, and wherein the processing time period for the uplink control information is a processing time period for the terminal device to receive a physical downlink shared channel (PDSCH) and sends an uplink acknowledgment signal of ACK or NACK.

\* \* \* \* \*